US010568118B2

(12) United States Patent

Yeo et al.

(10) Patent No.: US 10,568,118 B2

(45) Date of Patent: Feb. 18, 2020

(54) METHOD AND APPARATUS FOR TRANSMITTING CONTROL AND DATA SIGNALS BASED ON A SHORT TTI IN A WIRELESS CELLULAR COMMUNICATION SYSTEM

(71) Applicant: Samsung Electronics Co., Ltd., Suwon-si, Gyeonggi-do (KR)

(72) Inventors: Jeongho Yeo, Hwaseong-si (KR); Sungjin Park, Incheon (KR); Jinyoung Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/033,712

(22) Filed: Jul. 12, 2018

(65) Prior Publication Data

US 2019/0021104 A1 Jan. 17, 2019

(30) Foreign Application Priority Data

Jul. 12, 2017 (KR) ........................ 10-2017-0088652
Nov. 16, 2017 (KR) ........................ 10-2017-0153187
Feb. 14, 2018 (KR) ........................ 10-2018-0018765

(51) Int. Cl.
*H04W 72/12* (2009.01)
*H04W 72/04* (2009.01)

(52) U.S. Cl.
CPC ... *H04W 72/1263* (2013.01); *H04W 72/0446* (2013.01); *H04W 72/1205* (2013.01); *H04W 72/1289* (2013.01)

(58) Field of Classification Search
CPC combination set(s) only.
See application file for complete search history.

(56) References Cited

U.S. PATENT DOCUMENTS

2017/0215179 A1* 7/2017 Choi ................. H04W 72/0413
2017/0230994 A1* 8/2017 You ..................... H04W 72/042
2018/0049165 A1 2/2018 Byun et al.
2018/0124711 A1* 5/2018 Hosseini ............. H04W 52/146
(Continued)

FOREIGN PATENT DOCUMENTS

WO 2016/143968 A1 9/2016

OTHER PUBLICATIONS

NTT Docomo, Inc., 'sPUCCH resource management', R1-1708419, May 6, 2017, 3GPP TSG RAN WG1 Meeting #89, Hangzhou, China.

(Continued)

*Primary Examiner* — Khaled M Kassim
*Assistant Examiner* — Syed Ali
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for Internet of things (IoT) are provided. The disclosure may be applied to intelligent services based on the 5G communication technology and the IoT-related technology, such as smart home, smart building, smart city, smart car, connected car, health care, digital education, smart retail, security, and safety services. A shortened transmission time interval (TTI)-based downlink (DL) and uplink (UL) transmission method and apparatus for use in a wireless communication system.

8 Claims, 18 Drawing Sheets

(56) References Cited

U.S. PATENT DOCUMENTS

| | | | | |
|---|---|---|---|---|
| 2018/0131498 | A1* | 5/2018 | Chen | H04L 5/0007 |
| 2018/0227955 | A1* | 8/2018 | Hosseini | H04W 52/367 |
| 2019/0069312 | A1* | 2/2019 | Oh | H04W 72/04 |
| 2019/0116594 | A1* | 4/2019 | Kwak | H04W 72/0453 |
| 2019/0140878 | A1* | 5/2019 | Takeda | H04W 72/0413 |
| 2019/0190763 | A1* | 6/2019 | Takeda | H04L 5/0053 |
| 2019/0254049 | A1* | 8/2019 | Takeda | H04L 1/0026 |
| 2019/0261383 | A1* | 8/2019 | Kwak | H04L 1/1819 |
| 2019/0297572 | A1* | 9/2019 | Rahman | H04W 52/36 |

OTHER PUBLICATIONS

Potevio, 'Uplink DMRS Design for 2-symbol sPUSCH', May 5, 2017, R1-1708536, 3GPP TSG RAN WG1 Meeting #89, Hangzhou, China.

Ericsson, 'FS2 aspects of short TTI', R1-1708868, May 6, 2017, 3GPP TSG RAN WG1 Meeting #89, Hangzhou, China.

Samsung, 'DL DMRS design', R1-1707897, May 6, 2017, 3GPP TSG RAN WG1 Meeting #89, Hangzhou, China.

International Search Report dated Oct. 16, 2018, issued in International Patent Application No. PCT/KR2018/007918.

* cited by examiner

SYMBOL INDEX IN SUBFRAME (1301)
0 1 2 3 4 5 6 7 8 9 10 11 12 13 0 1 2 3 4 5 6 7 8 9 10 11 12 13
1303 DL
sTTI 0 sTTI 1 sTTI 2 sTTI 3 sTTI 4 sTTI 5 sTTI 0 sTTI 1 sTTI 2 sTTI 3 sTTI 4 sTTI 5
1305 UL
sTTI 0 sTTI 1 sTTI 2 sTTI 3 sTTI 4 sTTI 5 sTTI 0 sTTI 1 sTTI 2 sTTI 3 sTTI 4 sTTI 5
1307
1309
1 bits (1311)
2 bits (1313)
UL DMRS position indication
1317
1319
1315
sTTI 0
sTTI 1
R D D
R D
D D R
D R
D D
D D|R SYMBOL INDEX IN SUBFRAME (1401)
0 1 2 3 4 5 6 7 8 9 10 11 12 13 0 1 2 3 4 5 6 7 8 9 10 11 12 13
1403
DL
sTTI 0
sTTI 1
sTTI 2
sTTI 3
sTTI 4
sTTI 5
sTTI 0
sTTI 1
sTTI 2
sTTI 3
sTTI 4
sTTI 5
1411
1407
1413
1409
1405
UL
sTTI 0
sTTI 1
sTTI 0
sTTI 1
1417
1419

METHOD AND APPARATUS FOR TRANSMITTING CONTROL AND DATA SIGNALS BASED ON A SHORT TTI IN A WIRELESS CELLULAR COMMUNICATION SYSTEM

CROSS-REFERENCE TO RELATED APPLICATION(S)

This application is based on and claims priority under 35 U.S.C. § 119(a) of a Korean patent applications number 10-2017-0088652, filed on Jul. 12, 2017, in the Korean Intellectual Property Office, of a Korean patent application number 10-2017-0153187, filed on Nov. 16, 2017, in the Korean Intellectual Property Office, and of a Korean patent application number 10-2018-0018765, filed on Feb. 14, 2018, in the Korean Intellectual Property Office, the disclosure of each of which is incorporated by reference herein in its entirety.

BACKGROUND

1. Field

The disclosure relates to a wireless communication system. More particularly, the disclosure relates to a short transmission time interval-based downlink (DL) and uplink (UL) transmission method and apparatus.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

One of the important criteria determining the throughput of a wireless cellular communication system is packet data latency. Long term evolution (LTE) employs a transmission time interval (TTI) of 1 ms, which is identical with the length of one subframe. An LTE system employing a TTI of 1 ms may support a user equipment (UE) operating with a TTI shorter than 1 ms (shortened TTI/shorter-TTI UE). The shortened-TTI UE is predicted to be suitable for latency-sensitive services such as voice over LTE (VoLTE) and remote control services. The shortened-TTI UE is expected to be a means for realizing mission-critical IoT.

In the current LTE and long term evolution advance (LTE-A) systems, evolved node Bs (eNBs) and UEs are designed to perform transmission/reception with the unit of a subframe equal in length to a TTI. In order to support the shortened-TTI UE operating with a TTI shorter than 1 ms in the environment designed to support eNBs and UEs operating with a TTI length of 1 ms, it is necessary to define a transmission and reception operation different from that defined for a normal LTE and LTE-A UE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a transmission and reception method and apparatus for supporting a transmission time interval (TTI) shorter than 1 ms in a legacy long term evolution (LTE) system as well as a fifth generation (5G) or NR system.

In accordance with an aspect of the disclosure, a method of a terminal in a wireless communication system is provided. the method includes receiving configuration information on a shortened transmission time interval (sTTI); and transmitting uplink control information on a short physical uplink control channel (SPUCCH), wherein, when uplink sTTIs include 2 or 3 symbols and the uplink control information is transmitted on sTTIs corresponding to index n and n+1, a frequency resource of a last symbol of the sTTI corresponding to index n and a frequency resource of a first symbol of the sTTI corresponding to index n+1 are the same.

The method may further include receiving downlink control information scheduling uplink data on a downlink sTTI; and transmitting the uplink data on an uplink sTTI, wherein, when the uplink sTTI includes 7 symbols and the downlink sTTI includes 2 or 3 symbols, the downlink sTTI on which the downlink control information is received is predetermined. The method may further include receiving downlink control information scheduling uplink data, the downlink control information including uplink index information; and transmitting the uplink data on at least one uplink sTTI based on the uplink index information. The uplink data may be transmitted on two uplink sTTIs based on the downlink control information when a least significant bit (LSB) and most significant bit (MSB) are 1 in the uplink index information.

In accordance with an aspect of the disclosure, a method of a base station in a wireless communication system is provided. The method includes transmitting configuration information on a shortened transmission time interval (sTTI); and receiving uplink control information on a short physical uplink control channel (SPUCCH), wherein, when uplink sTTIs include 2 or 3 symbols and the uplink control information is received on sTTIs corresponding to index n and n+1, a frequency resource of a last symbol of the sTTI corresponding to index n and a frequency resource of a first symbol of the sTTI corresponding to index n+1 are the same.

In accordance with an aspect of the disclosure, a terminal in a wireless communication system is provided. The terminal includes a transceiver; and a processor coupled with the transceiver and configured to: receive configuration information on a shortened transmission time interval (sTTI), and transmit uplink control information on a short physical uplink control channel (SPUCCH), wherein, when uplink sTTIs include 2 or 3 symbols and the uplink control information is transmitted on sTTIs corresponding to index n and n+1, a frequency resource of a last symbol of the sTTI corresponding to index n and a frequency resource of a first symbol of the sTTI corresponding to index n+1 are the same.

In accordance with an aspect of the disclosure, a base station in a wireless communication system is provided. The base station includes a transceiver; and a processor coupled to the transceiver and configured to: transmit configuration information on a shortened transmission time interval (sTTI), and receive uplink control information on a short physical uplink control channel (SPUCCH), wherein, when uplink sTTIs include 2 or 3 symbols and the uplink control information is received on sTTIs corresponding to index n and n+1, a frequency resource of a last symbol of the sTTI corresponding to index n and a frequency resource of a first symbol of the sTTI corresponding to index n+1 are the same.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
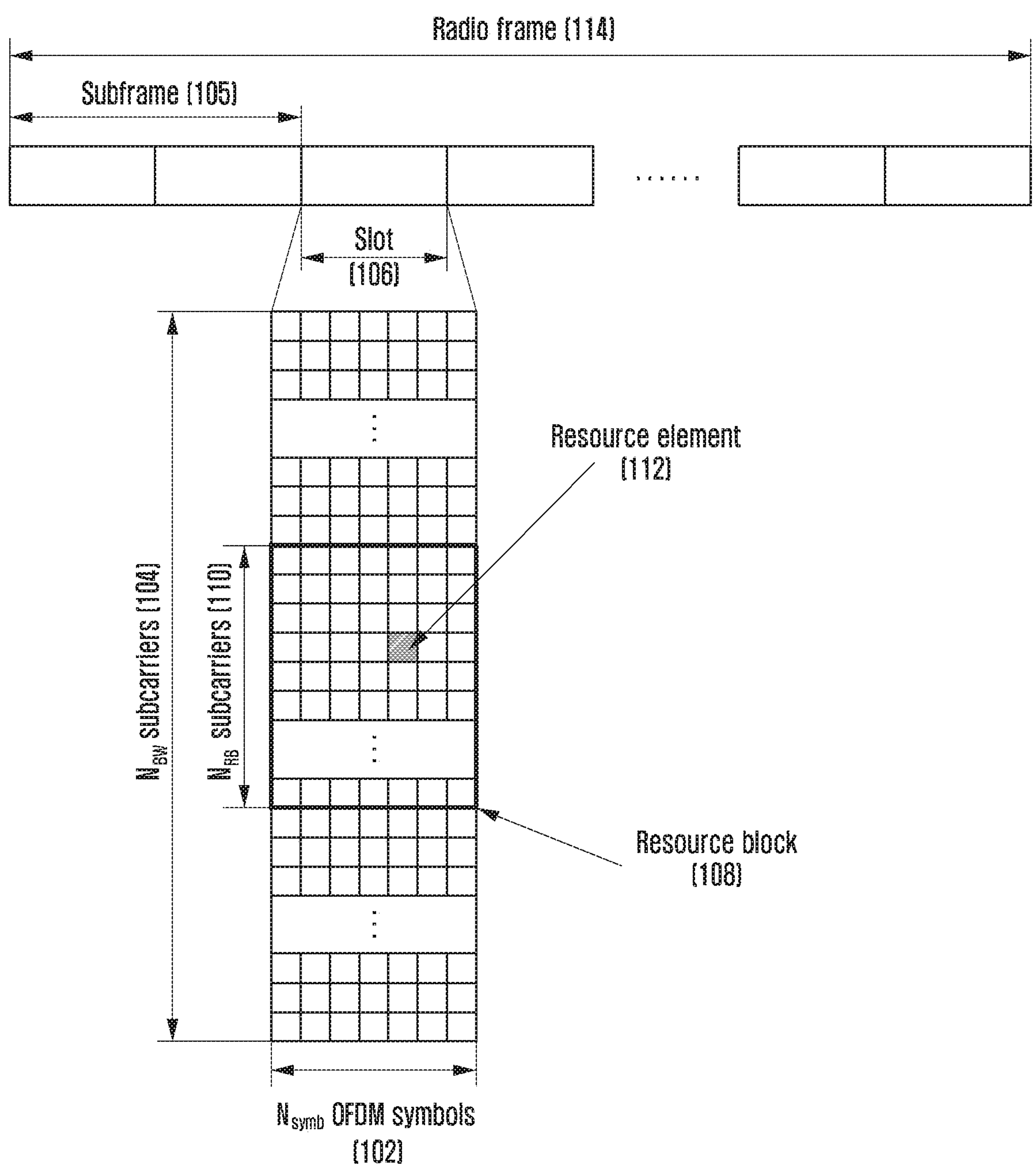
FIG. 1 is a diagram illustrating a basic time-frequency resource structure for transmitting downlink (DL) data or control channels in the long term evolution (LTE) system according to embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of well-known functions and structures incorporated herein may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the disclosure and methods of accomplishing the same may be understood more readily by reference to the following detailed description of embodiments and the accompanying drawings. The disclosure may, however, be embodied in many different forms and should not be construed as being limited to the various embodiments set forth herein. Rather, these embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams.

These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

The wireless communication system has evolved to a broadband wireless communication system (such as 3GPP high-speed packet access (HSPA), long term evolution (LTE) or evolved universal terrestrial radio access (E-UTRA), LTE-advanced (LTE-A), 3GPP2 high rate packet data (HRPD), ultra-mobile broadband (UMB), and Institute of Electrical and Electronics Engineers (IEEE) 802.16e) supporting a high-speed, high-quality wireless packet data service. Recently, discussions have been underway on the 5G new radio (NR) standardization for next generation wireless communication systems.

The LTE system as one of the representative broadband wireless communication systems uses orthogonal frequency division multiplexing (OFDM) in the downlink (DL) and single carrier frequency division multiple access (SC-FDMA) in the uplink (UL). The term "uplink" denotes a radio transmission path from a user equipment (UE, or mobile station (MS)) to a base station (BS or evolved Node B (eNB)), and the term "downlink" denotes a radio transmission path from the eNB to the UE. Such a multiple access scheme is characterized by allocating the time-frequency resources for transmitting user-specific data and control information without overlap of each other, i.e. maintaining orthogonality, so as to distinguish among user-specific data and control information.

The LTE system adopts a hybrid automatic repeat request (HARQ) scheme for physical layer retransmission when decoding failure occurs in an initial data transmission. The HARQ scheme is designed to operate in such a way that a receiver that fails in decoding data sends a transmitter a negative acknowledgement (NACK) indicative of decoding failure in order for the transmitter to retransmit the corresponding data on the physical layer. The receiver combines the retransmitted data with the decoding-failed data to improve data reception performance. It may also be possible for the receiver to send the transmitter an acknowledgement (ACK) indicative of successful decoding, when the data are decoded successfully, in order for the transmitter to transmit new data.

FIG. 1 is a diagram illustrating a basic time-frequency resource structure for transmitting DL data or control channels in the LTE system according to an embodiment of the disclosure.

Referring to FIG. 1, the horizontal axis denotes the time, and the vertical axis denotes the frequency. The smallest transmission unit in the time domain is an OFDM symbol, $N_{symb}$ OFDM symbols 102 form a slot 106, and 2 slots form a subframe 105. Each slot spans 0.5 ms, and each subframe spans 1.0 ms. A radio frame 114 is a time unit consisting of 10 subframes. In the frequency domain, the smallest transmission unit is a subcarrier, and the total system transmission bandwidth consists of $N_{BW}$ subcarriers 104.

In the time-frequency resource structure, the basic resource unit is a resource element (RE) 112 indicated by an OFDM symbol index and a subcarrier index. A resource block (RB) or physical resource block (PRB)) 108 is defined by $N_{symb}$ consecutive OFDM symbols 102 in the time domain and $N_{RB}$ consecutive subcarriers 110 in the frequency domain. That is, one RB 108 consists of $N_{symb} \times N_{RB}$ REs 112. Typically, the RB is the smallest data transmission unit. Typically, in the LTE system, $N_{symb}=7$, $N_{RB}=12$, and $N_{BW}$ and $N_{RB}$ are proportional to the system transmission bandwidth. The data rate increases in proportion to the number of RBs scheduled to the terminal. For the LTE system, 6 transmission bandwidths are defined.

In the case of a frequency division duplexing (FDD) system in which DL and uplink are separated in frequency, the DL transmission bandwidth and uplink transmission bandwidth may differ from each other. The channel bandwidth denotes a radio frequency (RF) bandwidth in comparison with the system transmission bandwidth. Table 1 shows the relationship between the system transmission bandwidth and channel bandwidth defined in the LTE standard. For example, an LTE system having a 10 MHz channel bandwidth uses the transmission bandwidth of 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The DL control information is transmitted in N OFDM symbols at the beginning of the subframe. Typically, N={1, 2, 3}. Accordingly, N value varies at every subframe depending on the control information amount to be transmitted. The control information includes a control channel transmission period indicator for indicating a number of OFDM symbols for conveying the control information, scheduling information for DL or UL data transmission, and an HARQ ACK/NACK signal.

In the LTE system, the DL or uplink data scheduling information is transmitted from the base station to the terminal using downlink control information (DCI). The UL denotes a radio link for transmitting data or control signals from the terminal to the base station, and the DL denotes a radio link for transmitting data or control signals from the base station to the terminal. The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

- Resource allocation type 0/1 flag: Resource allocation type 0/1 flag indicates whether the resource allocation scheme is Type 0 or Type 1. A Type-0 is to allocate resources in units of resource block group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type-0 scheme. A Type-1 is to allocate a particular RB in an RBG.
- Resource block assignment: Resource block assignment indicates an RB allocated for data transmission. The resources may be determined depending on the system bandwidth and the resource allocation scheme.
- Modulation and coding scheme (MCS): MCS indicates a modulation scheme used for data transmission and a size of a transport block to be transmitted.
- HARQ process number: HARQ process number indicates a process number of HARQ.
- New data indicator: New data indicator indicates whether the HARQ transmission is an initial transmission or a retransmission.
- Redundancy version: Redundancy version indicates a redundancy version of HARQ.
- TPC command for PUCCH: transmit power control (TPC) command for physical uplink control channel (PUCCH) indicates a power control command for a PUCCH that is an UL control channel.

The DCI may be transmitted over a physical downlink control channel (PDCCH) or enhanced PDCCH (EPDCCH) after undergoing a channel coding and modulation process. In the following description, PDCCH transmission/reception may be understood as DCI transmission/reception on the PDCCH. Other channels may be understood in a similar way.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

DL data may be transmitted over a physical downlink shared channel (PDSCH) that is a physical channel for DL data transmission. A PDSCH may be transmitted after the control channel transmission period, and the scheduling information such as the detailed mapping location in the frequency domain and the modulation scheme may be indicated by the DCI that is transmitted over the PDCCH.

Using a 5-bit MCS in the control information constituting the DCI, the base station notifies the terminal of the modulation scheme applied to the PDSCH to be transmitted and the size of data (e.g., transport block size (TBS)) to be transmitted. The TBS corresponds to the size given before channel coding for error correction is applied to the data (e.g., transport block (TB)) to be transmitted by the base station.

The modulation schemes supported by the LTE system may include quadrature phase shift keying (QPSK), 16 quadrature amplitude modulation (QAM), and 64 QAM, and they have modulation orders ($Q_m$) 2, 4, and 6, respectively. That is, the QPSK modulation transmits 2 bits per symbol, the 16 QAM transmits 4 bits per symbol, and the 64 QAM transmits 6 bits per symbol.

Figure 2:
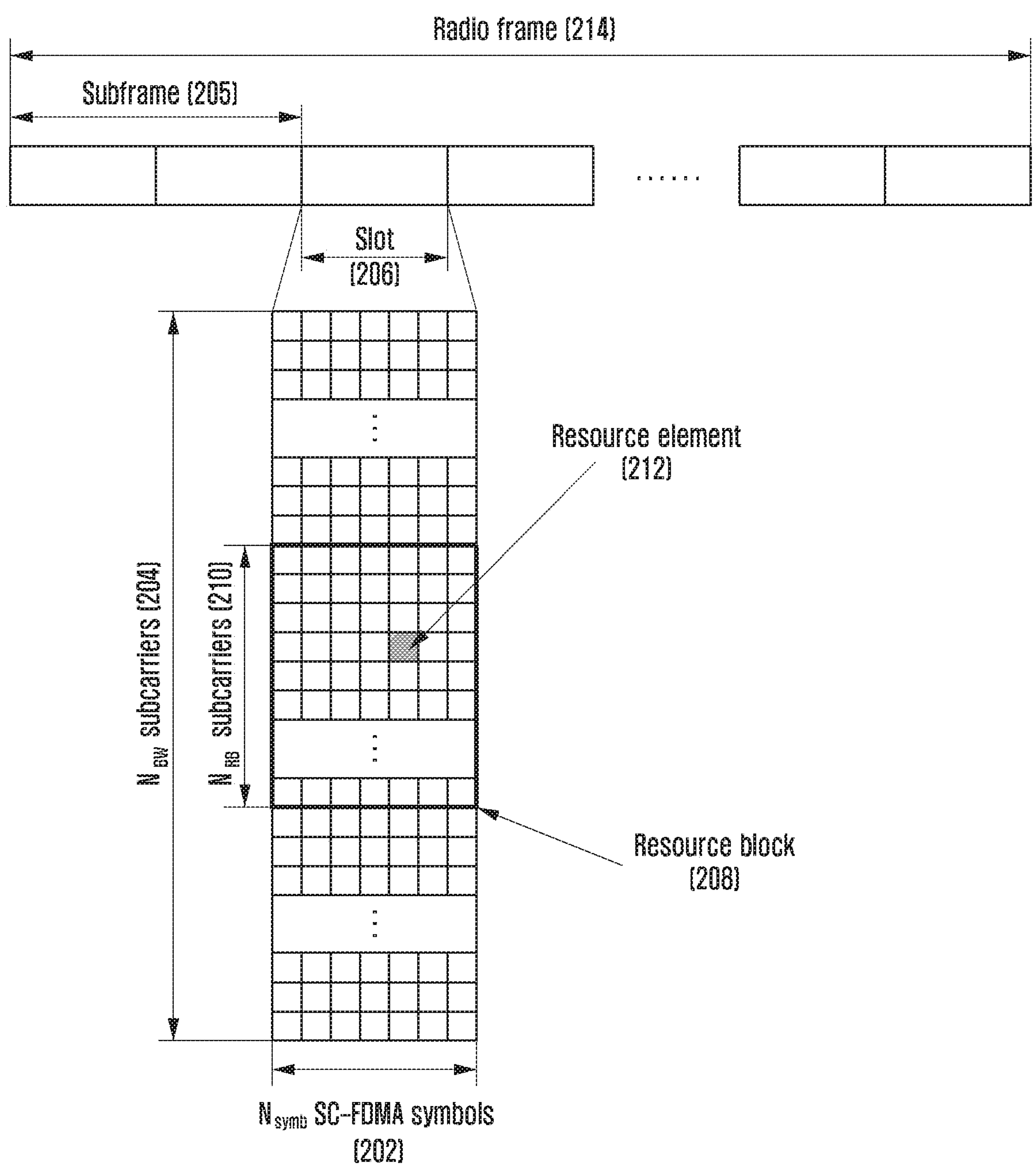
FIG. 2 is a diagram illustrating a basic time-frequency resource structure for transmitting uplink (UL) data or control channels in an LTE system according to embodiment of the disclosure.

FIG. 2 is a diagram illustrating a basic time-frequency resource structure for transmitting UL data or control channels in a LTE-A system, according to the related art.

In reference to FIG. 2, the horizontal axis denotes the time, and the vertical axis denotes the frequency. The smallest transmission unit in the time domain is an SC-FDMA symbol, $N_{symb}$ SC-FDMA symbols 202 form a slot 206, and 2 slots form a subframe 205. In the frequency domain, the smallest transmission unit is a subcarrier, and the total system transmission bandwidth consists of $N_{BW}$ subcarriers 204. Here, $N_{BW}$ is proportional to the system transmission bandwidth.

In the time-frequency resource structure, the basic resource unit is an RE 212 indicated by an SC-FDMA symbol index and a subcarrier index. An RB (or PRB) 208 is defined by $N_{symb}$ consecutive SC-FDMA symbols 202 in the time domain and $N_{RB}$ consecutive subcarriers 210 in the frequency domain. That is, one RB 208 consists of $N_{symb}\times N_{RB}$ REs 112. Typically, the RB is the smallest resource unit for data or control information transmission. Typically, the PUCCH is mapped to an RB in the frequency domain and transmitted during one subframe The LTE standard defines a relationship between the PDSCH or the PDCCH or EPDCCH carrying a semi-persistent scheduling (SPS) release and the PUCCH or PUSCH carrying the HARQ ACK/NACK corresponding to the PDSCH, PDCCH, or EPDCCH. For example, in an LTE system operating in the FDD mode, the HARQ ACK/NACK corresponding to the PDSCH or the PDCCH or EPDCCH carrying the SPS release, the PDSCH or the PDCCH or EPDCCH being transmitted at the $(n-4)^{th}$ subframe, is carried in the PUCCH or PUSCH being transmitted at the $n^{th}$ subframe.

The LTE employs an asynchronous HARQ scheme for DL HARQ. That is, if an eNB receives an HARQ NACK for initially transmitted data from a UE, it may freely determine a retransmission timing through a scheduling operation. If the UE fails to decode the received data, it stores the erroneous initial data and combines the buffered data with the retransmitted data.

If the UE receives a PDSCH carrying the DL data transmitted by the eNB at the $n_{th}$ subframe, it transmits UL control information including the HARQ ACK/NACK corresponding to the DL data to the eNB through the PUCCH or PUSCH at $(n+k)^{th}$ subframe. Here, k is determined differently depending on the duplex mode in use, i.e., FDD or time division duplex (TDD); and, in TDD, the TDD subframe configuration in use by the LTE system. For example, k is fixed to 4 in the FDD LTE system. Whereas, k is variable according to the subframe configuration and subframe index in the TDD LTE system.

Unlike the DL HARQ, the LTE employs a synchronous HARQ scheme with a fixed data transmission timing. That is, the UL-DL timing relationship between the PUSCH and PDCCH that is followed by the PUSCH and a physical hybrid indicator channel (PHICH) carrying the DL HARQ ACK/NACK corresponding to the PUSCH is fixed according to a rule as follows.

If the UE receive a PDCCH carrying UL scheduling control information or a PHICH carrying a DL HARQ ACK/NACK from the eNB at $n^{th}$ subframe, it transmits UL data through a PUSCH at the $(n+k)^{th}$ subframe based on the control information. Here, k is determined differently depending of the duplex mode in use, i.e., FDD or TDD; and, in TDD, the TTD subframe configuration. For example, k is fixed to 4 in the FDD LTE system. Whereas, k is variable according to the subframe configuration and subframe index in the TDD LTE system.

The UE receives the PHICH carrying the DL HARQ ACK/NACK from the eNB at the $i^{th}$ subframe and the DL HARQ ACK/NACK corresponding to the PUSCH transmitted by the UE at the $(i+k)^{th}$ subframe. Here, k is determined differently depending of the duplex mode in use, i.e., FDD or TDD; and, in TDD, the TDD subframe configuration in use by the LTE system. For example, k is fixed to 4 in the FDD LTE system. Whereas, k is variable according to the subframe configuration and subframe index in the TDD LTE system.

Figure 3:
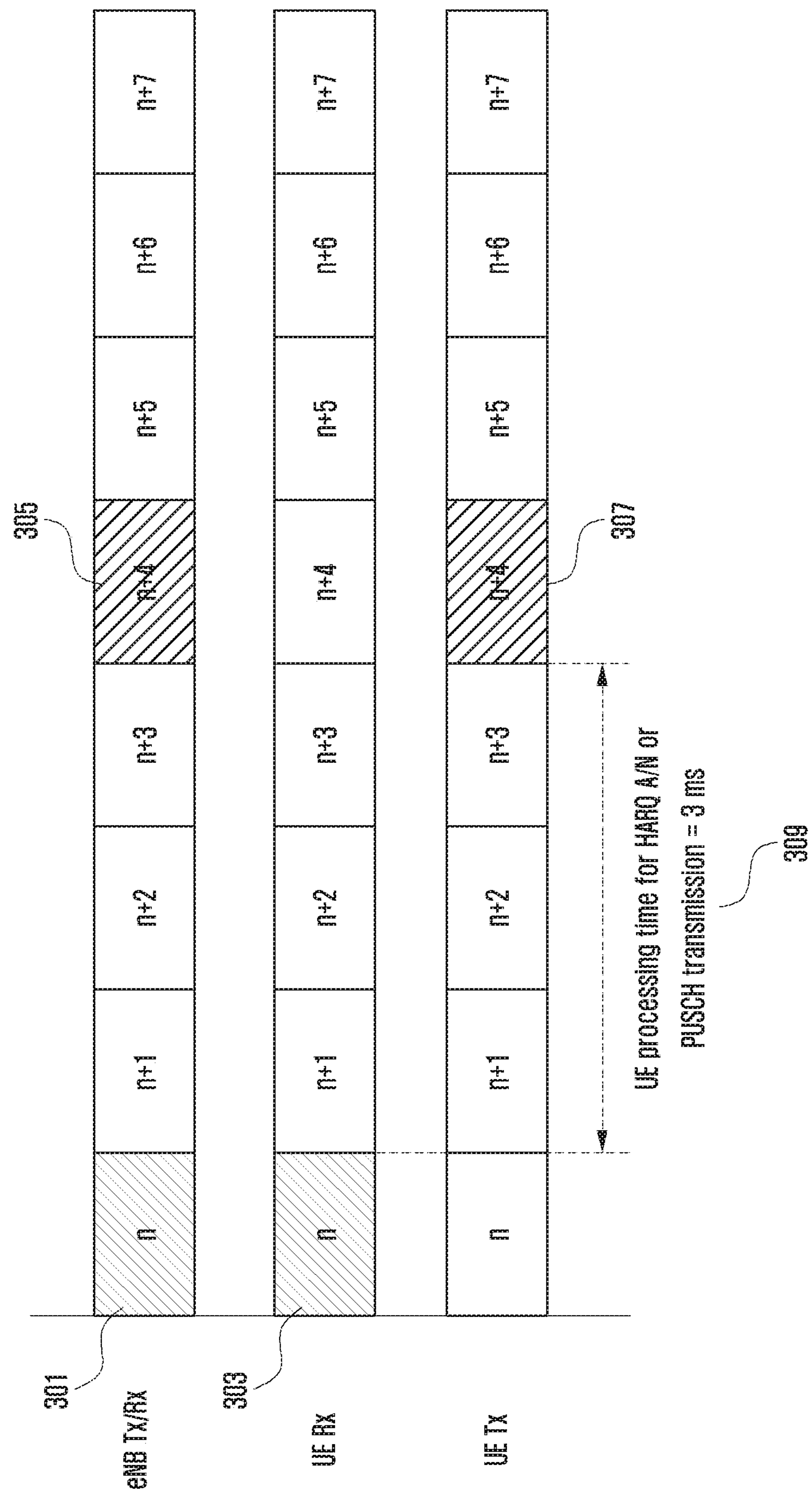
FIG. 3 is a diagram illustrating first and second signal transmission and reception timings at an evolved node B (eNB) and a user equipment (UE), under the assumption that a propagation delay is 0, in an LTE system according to embodiment of the disclosure.

FIG. 3 is a diagram illustrating transmission timings of an eNB and a UE in an FDD LTE system according to an embodiment of the disclosure. The UE transmits UL data based on a UL grant received from the eNB and an HARQ ACK/NACK corresponding to the UL data. If the eNB transmits a UL grant or a DL assignment and data to the UE at the $n^{th}$ subframe 301, the UE receives the UL grant or the DL assignment and data at the $n^{th}$ subframe 303. If the UE receives a UL grant, it transmits UL data at the $(n+4)^{th}$ subframe 307. If the UE receives a DL assignment and data at the $n^{th}$ subframe, it transmits an HARQ ACK/NACK corresponding to the DL data at the $(n+4)^{th}$ subframe 307. In this case, a time period given for the UE to prepare UL data transmission scheduled via the UL grant or transmission of HARQ ACK/NACK corresponding to the DL data becomes 3 ms, corresponding to three subframes as denoted by reference number 309.

Typically, an eNB receives the signal transmitted by a UE with a propagation delay, which is determined depending on the distance between the UE and the eNB. The propagation delay may be thought of as a value obtained by dividing the propagation path from the UE to the eNB by the speed of light. For example, if the UE is located at a distance of 100 km away from the eNB, the eNB receives the signal transmitted by the UE after about 0.34 msec.

As aforementioned, the arrival time of the signal transmitted by the UE may vary depending on the distance between the UE and the eNB. Accordingly, although multiple UEs located a different distances transmit signals simultaneously, the signals may arrive at the eNB at a different timing. In order to overcome this phenomenon, i.e., in order to make it possible for the signals transmitted by multiple UEs to arrive at the eNB at the same timing, it may be necessary to differentiate the transmission timings of the terminals according to their locations, and this technique is called timing advance (TA) in LTE.

In the LTE system, the UE triggers random access (RA) by transmitting a random access channel (RACH) signal or a preamble to the eNB, and the eNB calculates a TA value for use by the UE to achieve UL synchronization and transmits a RA response including an 11-bit TA value to the UE. The UE achieves UL synchronization using the TA value. The eNB updates the TA value regularly and transmits a TA command to the UE for maintaining UL synchronization. The TA command is 6 bits in length and carried in a media access control (MAC) control element (CE). The UE adjusts the TA value by adding the value of the 6-bit TA command to the previously applied TA value.

Figure 4:
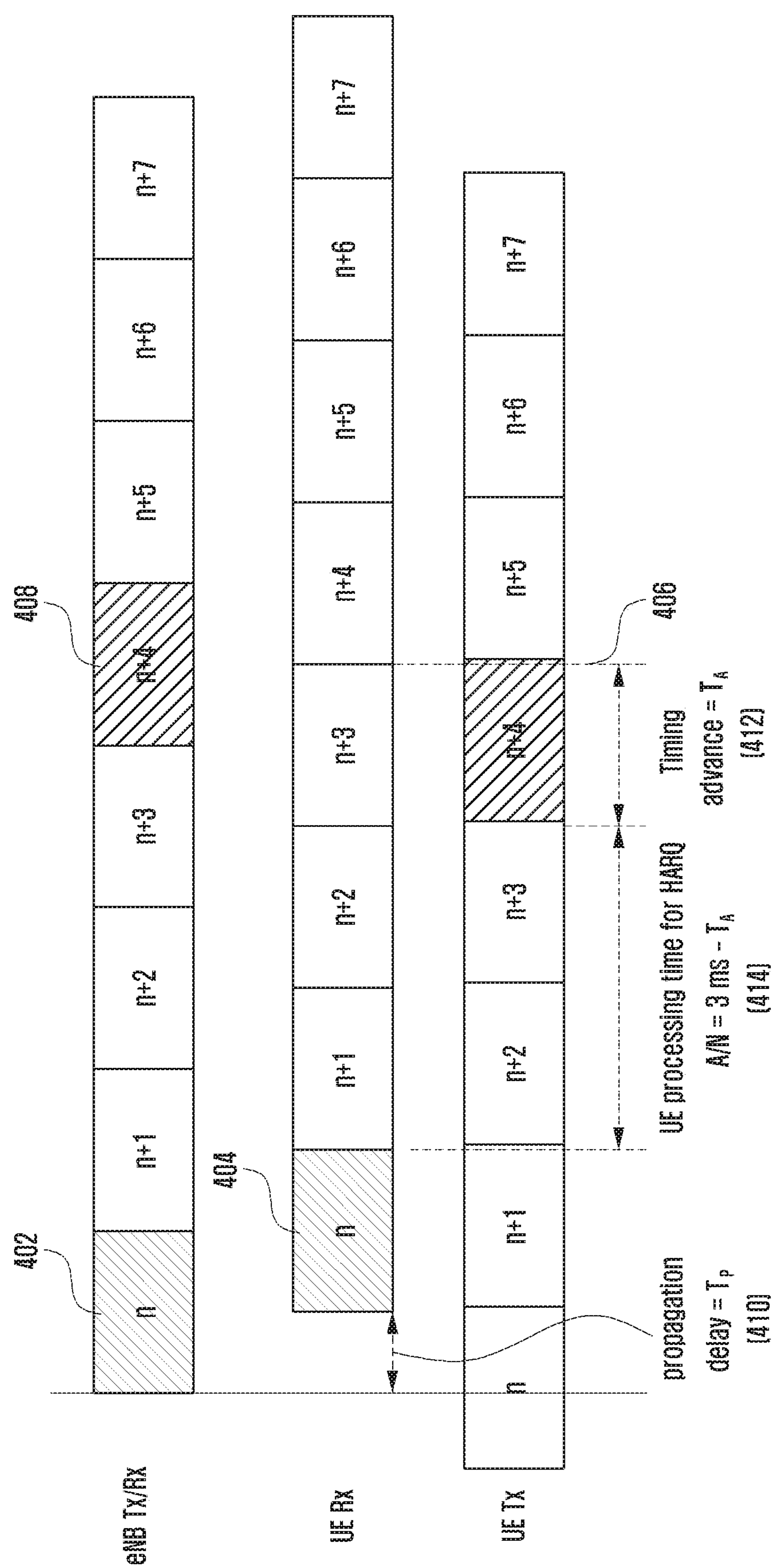
FIG. 4 is a diagram illustrating first and second signal transmission and reception timings at an eNB and a UE, under the assumption that a propagation delay is greater than 0 and timing advance (TA) is applied, in an LTE system according to embodiment of the disclosure.

FIG. 4 is a diagram illustrating transmission timings an eNB and a UE in an FDD LTE system when TA is applied according to an embodiment of the disclosure. The UE transmits UL data based on a UL grant received from the eNB and an HARQ ACK/NACK corresponding to the UL data. If the eNB transmits a UL grant or a DL assignment and data to the UE at the $n^{th}$ subframe 402, the UE receives the UL grant or the DL assignment and data at the $n^{th}$ subframe 404. Here, the UE receives the signal transmitted by the eNB with a propagation delay $T_P$ 410. If the UE receives a UL grant at the $n^{th}$ subframe, it transmits UL data at the $(n+4)^{th}$ subframe 406. If the UE receives a DL assignment and data at the $n^{th}$ subframe, it transmits an HARQ ACK/NACK corresponding to the DL data at the $(n+4)^{th}$ subframe 406.

The UE also transmit the UL data or the HARQ ACK/NACK corresponding to the DL data at a timing as much as TA 412 earlier than the (n+4)th subframe in order for the UL data or the HARQ ACK/NACK to arrive at the eNB at a scheduled timing. In this case, a time period given for the UE to prepare UL data transmission scheduled via the UL grant or transmission of HARQ ACK/NACK corresponding to the DL data may be calculated by subtracting $T_A$ from 3 ms, corresponding to three subframes as denoted by reference number 414. The time period of 3 ms—$T_A$ is designed for the legacy LTE and, if the TTI is shortened or the transmission timing is changed, it may be changed.

The eNB calculates an absolute value of the TA for the corresponding UE. The eNB may calculate the absolute value of the TA by adding or subtracting to or from the TA value transmitted to the UE in the RA procedure. In the disclosure, the absolute value of the TA may be a value obtained by subtracting the starting time of the $n^{th}$ TTI for reception from the starting time of the $n^{th}$ TTI for transmission.

One of the important criteria determining the throughput of a wireless cellular communication system is packet data latency. LTE employs a TTI of 1 ms, which is identical with the length of one subframe. An LTE system employing a TTI of 1 ms may support a UE operating with a TTI shorter than 1 ms (shortened TTI/short-TTI UE). Meanwhile, the 5G NR may employ a TTI shorter than 1 ms. The short-TTI UE is suitable for latency-sensitive services such as voice over LTE (VoLTE) and remote control services and is expected to be a means for realizing mission-critical IoT.

Figure 5:
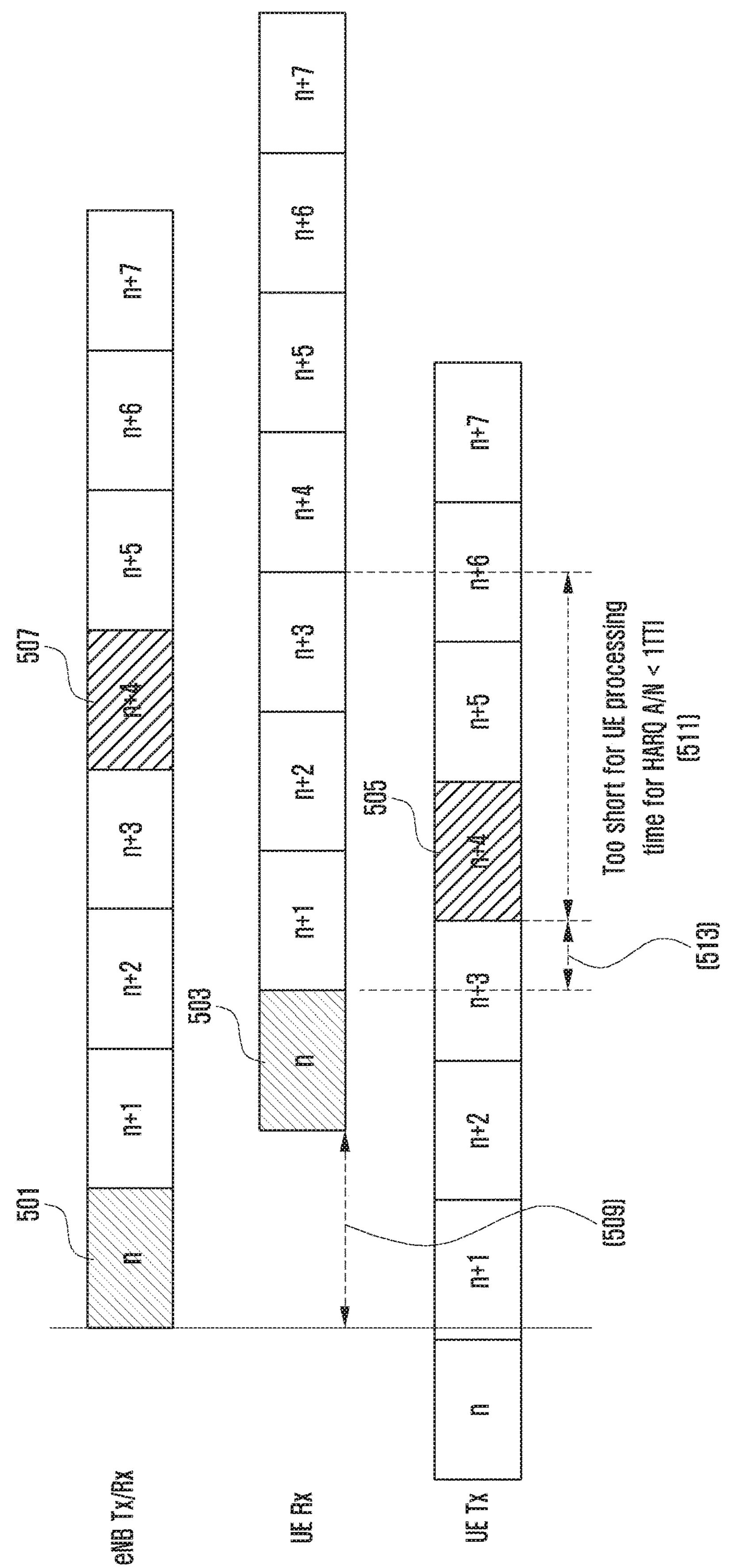
FIG. 5 is a diagram illustrating first and second signal transmission and reception timings at an eNB and a UE, under the assumption that a propagation delay is greater than 0 and TA is applied, in an LTE system according to embodiment of the disclosure.

FIG. 5 is a diagram illustrating signal transmission/reception timings of an eNB and a UE when a long TA is applied according to an embodiment of the disclosure. The time period given for the UE to prepare signal transmission, i.e., 3 ms−$T_A$, may be changed for a short-TTI UE or a UE with $T_A$ having a large absolute value as denoted by reference number 511 shown in FIG. 5. For example, if a UL grant is transmitted at the $n^{th}$ TTI 501 and 503 and if the corresponding UL data is transmitted at the $(n+4)^{th}$ TTI 505 and 507, the time period given for the UE to prepare the UL transmission becomes 3 TTIs-$T_A$ 513. If the TTI is shorter than 1 ms and if the distance between the UE and the eNB is so far that $T_A$ is large, the time period given for the UE to prepare the UL transmission may become a smaller and even negative number. In order to solve this problem, it may be possible to configure a maximum value of TA, which the UE assumes for a short-TTI operation. The maximum value of TA for the short-TTI operation may be less than the maximum TA value of the legacy LTE system or a value randomly assumed for determining UE capability rather than being predetermined between the eNB and the UE.

The services supported by NR systems may be categorized into three categories: enhanced mobile broadband (eMBB) for high-speed transmission of a large volume of data, massive machine type communications (mMTC) for transmit power minimization of a UE, and ultra-reliable and low-latency communications (URLLC) for an ultra-reliable and low latency goal. Here, different requirements are imposed according to the category of the services that are of interest to the UE. This means that a different operation is performed according to the service category in a predetermined time period; for example, it is important to perform a predetermined operation in a short time period for the URLLC having a delay-sensitive requirement. Accordingly, the TA restriction per UE may be determined differently depending on the category of the service in use by the UE. It may be possible to configure per-service maximum TA values or per-UE maximum TA values.

Embodiments of the disclosure are described in detail with reference to the accompanying drawings. Detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the specification.

In the following description, the term “base station (BS)” denotes an entity for allocating resources to UEs and is intended to include at least one of a Node B, an evolved Node B (eNB), a radio access unit, a base station controller, and a network node. The term “terminal” is intended to include a UE, a MS, a cellular phone, a smartphone, a computer, and a multimedia system with a communication function. Although the description is directed to the LTE or LTE-A system in the following description, it will be understood by those skilled in the art that the disclosure can be applied even to other communication systems having a similar technical background and channel format, with a slight modification, without departing from the spirit and scope of the disclosure.

In the following description, the term “shortened-TTI UE” is intended to mean a UE that is capable of transmitting control information, data, or control information and data during a TTI of 1 ms or shorter than 1 ms, and the term “normal-TTI UE” is intended to mean a UE that is capable of transmitting control information, data, or control information and data during a TTI of 1 ms. In the disclosure, the terms “shortened-TTI”, “shorter-TTI”, “shortened TTI”, “shorter TTI”, “short TTI”, and “sTTI” are interchangeably used with the same meaning. In the disclosure, the terms “normal-TTI”, “normal TTI”, “subframe TTI”, and “legacy TTI” are interchangeably used with the same meaning.

Figure 6:
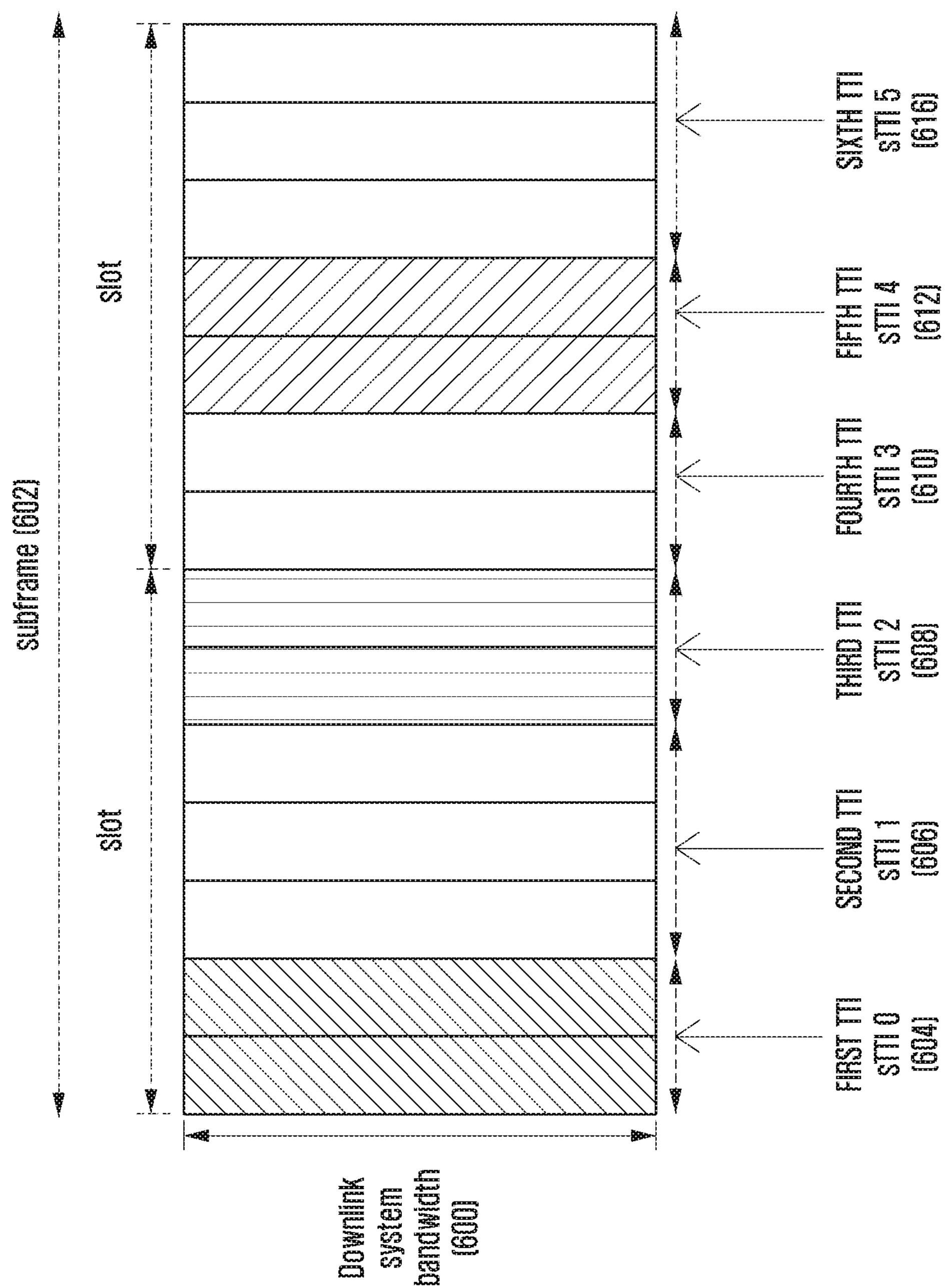
FIG. 6 is a diagram illustrating a pattern of transmission time intervals (sTTIs) having a length of two or three symbols each in a subframe—according to embodiment of the disclosure.
Figure 7:
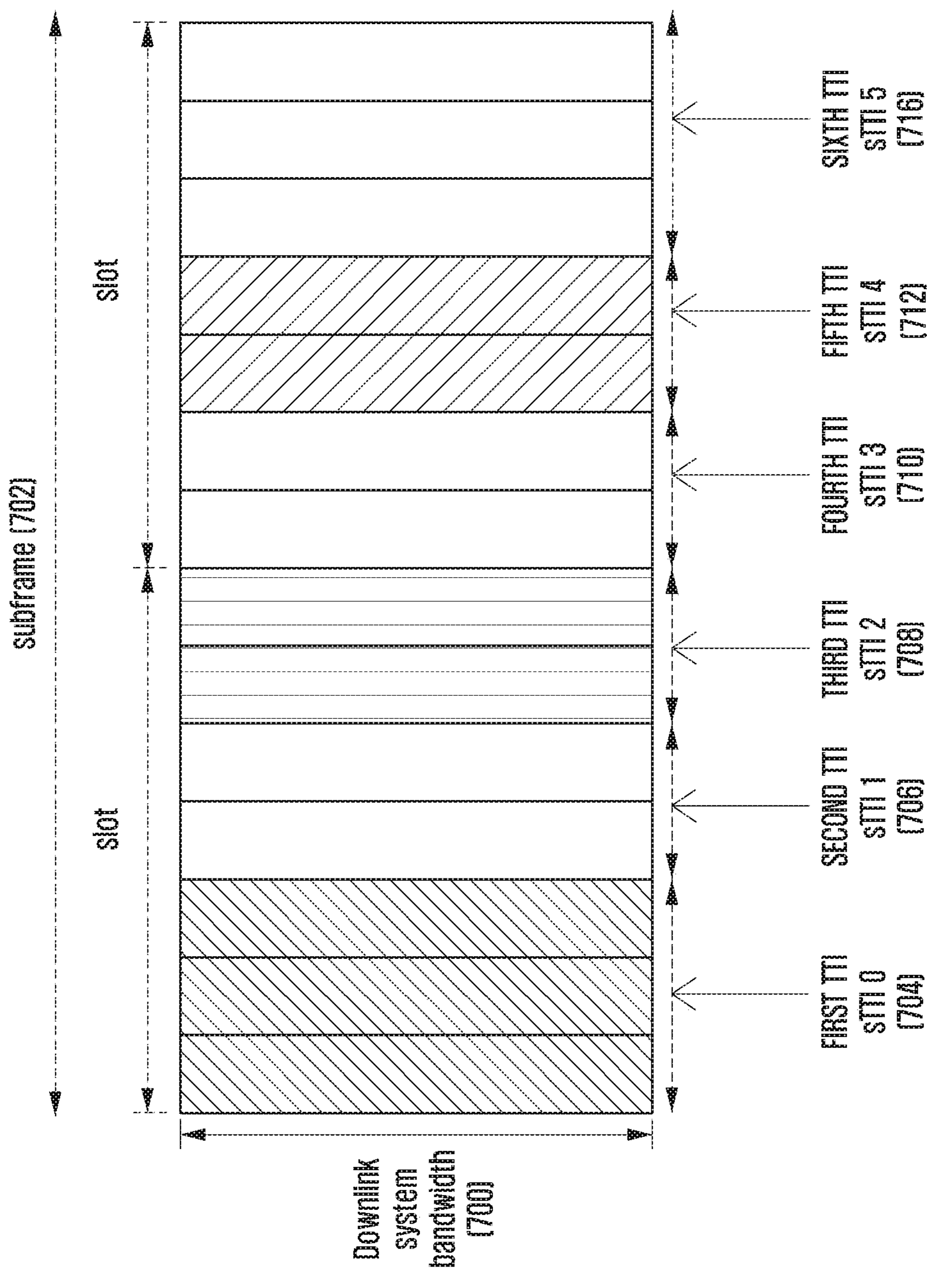
FIG. 7 is a diagram illustrating a pattern of sTTIs having a length of two or three symbols each in a subframe according to embodiment of the disclosure.

FIGS. 6 and 7 are diagrams illustrating a pattern of sTTIs having a length of two or three symbols each in a subframe according to various embodiments of the disclosure. FIG. 6 depicts a case where the 14 symbols constituting a subframe 602 are grouped by two or three into sTTIs in a pattern of 2, 3, 2, 2, 2, and 3: sTTI 0 604 with the first two symbols, sTTI 1 606 with the next three symbols, sTTI 2 608 with the next two symbols, sTTI 3 610 with the next two symbols, sTTI 4 612 with the next two symbols, and sTTI 5 616 with the last three symbols. The sTTI pattern of FIG. 6 is applied in mapping the legacy LTE PDCCH to two OFDM symbols. FIG. 7 depicts a case where the 14 symbols constituting a subframe 702 are grouped by two or three into sTTIs in a pattern of 3, 2, 2, 2, 2, and 3: sTTI 0 704 with the first three symbols, sTTI 1 706 with the next two symbols, sTTI 2 708 with the next two symbols, sTTI 3 710 with the next two symbols, sTTI 4 712 with the next two symbols, and sTTI 5 716 with the last three symbols. The sTTI pattern of FIG. 7 is applied in mapping the legacy LTE PDCCH to one or three OFDM symbols.

Figure 8:
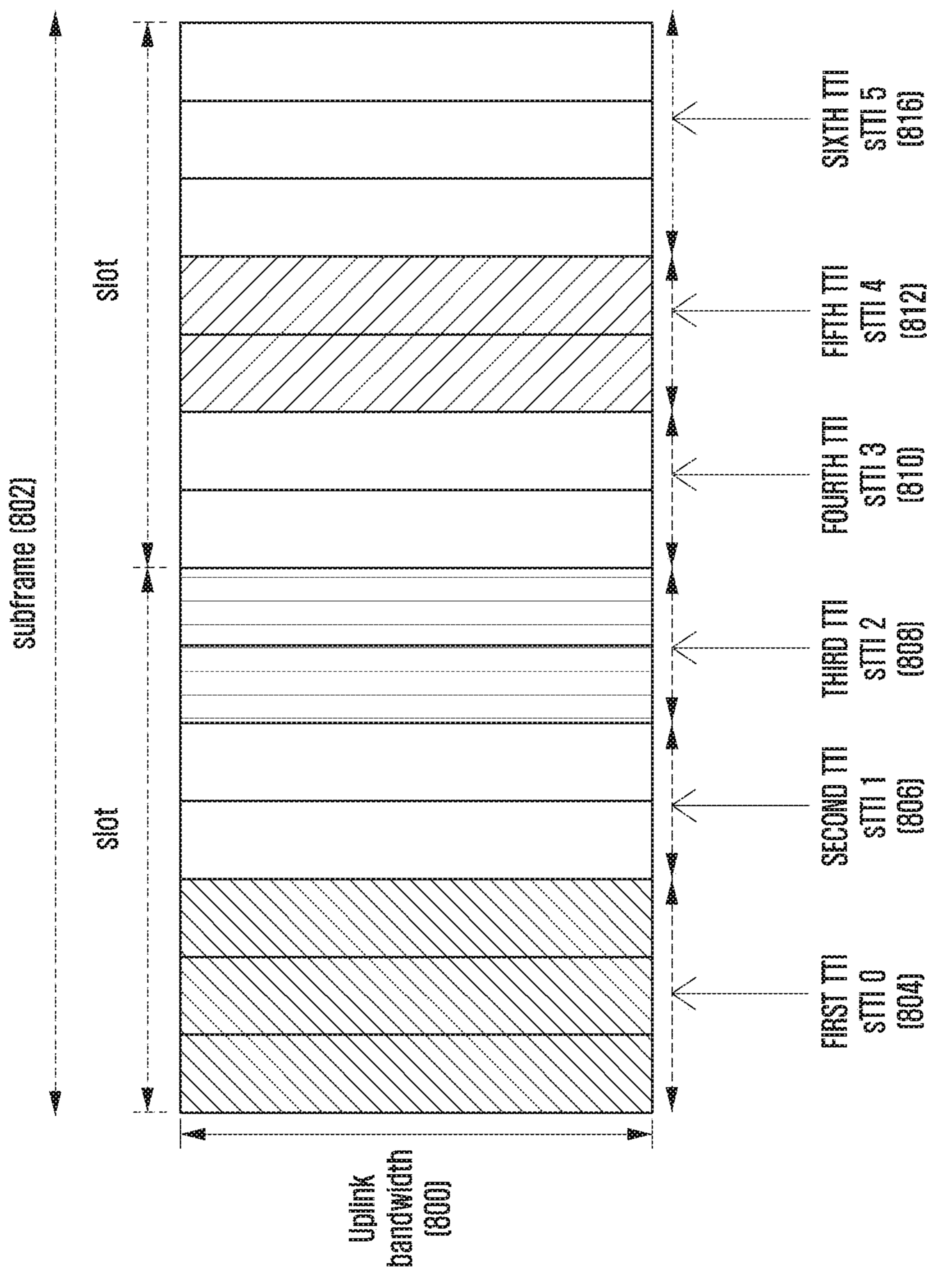
FIG. 8 is a diagram illustrating a pattern of sTTIs having a length of two or three symbols each in an UL subframe in association with sTTI indices according to embodiment of the disclosure.

FIG. 8 is a diagram illustrating a pattern of sTTIs having a length of two or three symbols each in a subframe in UL according to an embodiment of the disclosure. The 14 symbols constituting a subframe 802 are grouped by two or three into sTTIs in a pattern of 3, 2, 2, 2, 2, and 3: sTTI 0 804 with the first three symbols, sTTI 1 806 with the next two symbols, sTTI 2 808 with the next two symbols, sTTI 3 810 with the next two symbols, sTTI 4 812 with the next two symbols, and sTTI 5 816 with the last three symbols.

Figure 9:
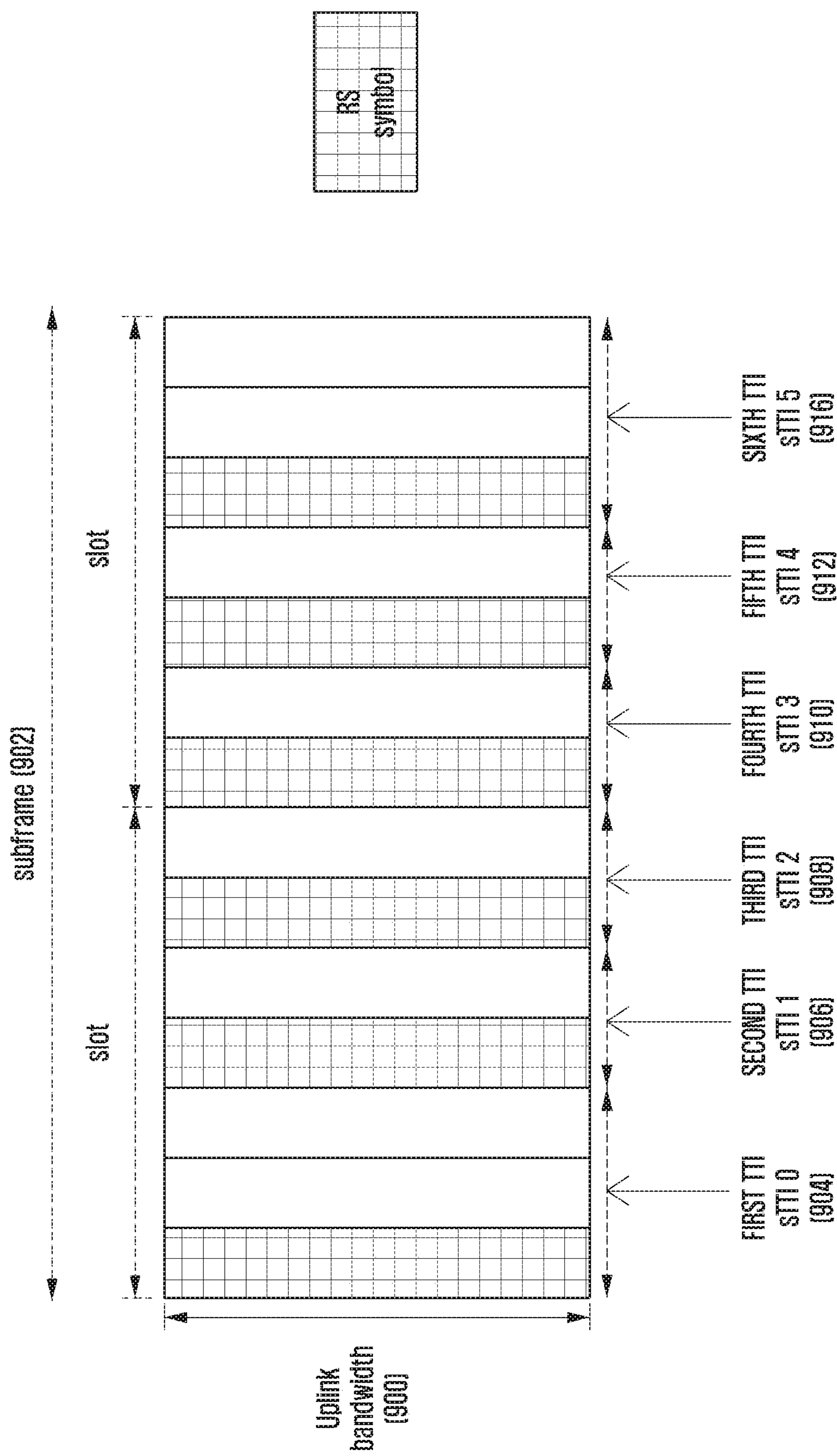
FIG. 9 is a diagram illustrating a pattern of sTTIs having a length of two or three symbols each in an UL subframe with reference signal (RS) symbols-according to embodiment of the disclosure.

FIG. 9 is a diagram illustrating a pattern of sTTIs having a length of two or three symbols each in a subframe in uplink, each sTTI having a symbol to which a UL reference signal (RS) is mapped according to an embodiment of the disclosure. In FIG. 9, the RS for data transmission is mapped to the first symbol of each sTTI. The symbol position of the UL RS may vary according to an indicator included in DCI carrying a UL grant, or the UL RS may be omitted.

Figure 10:
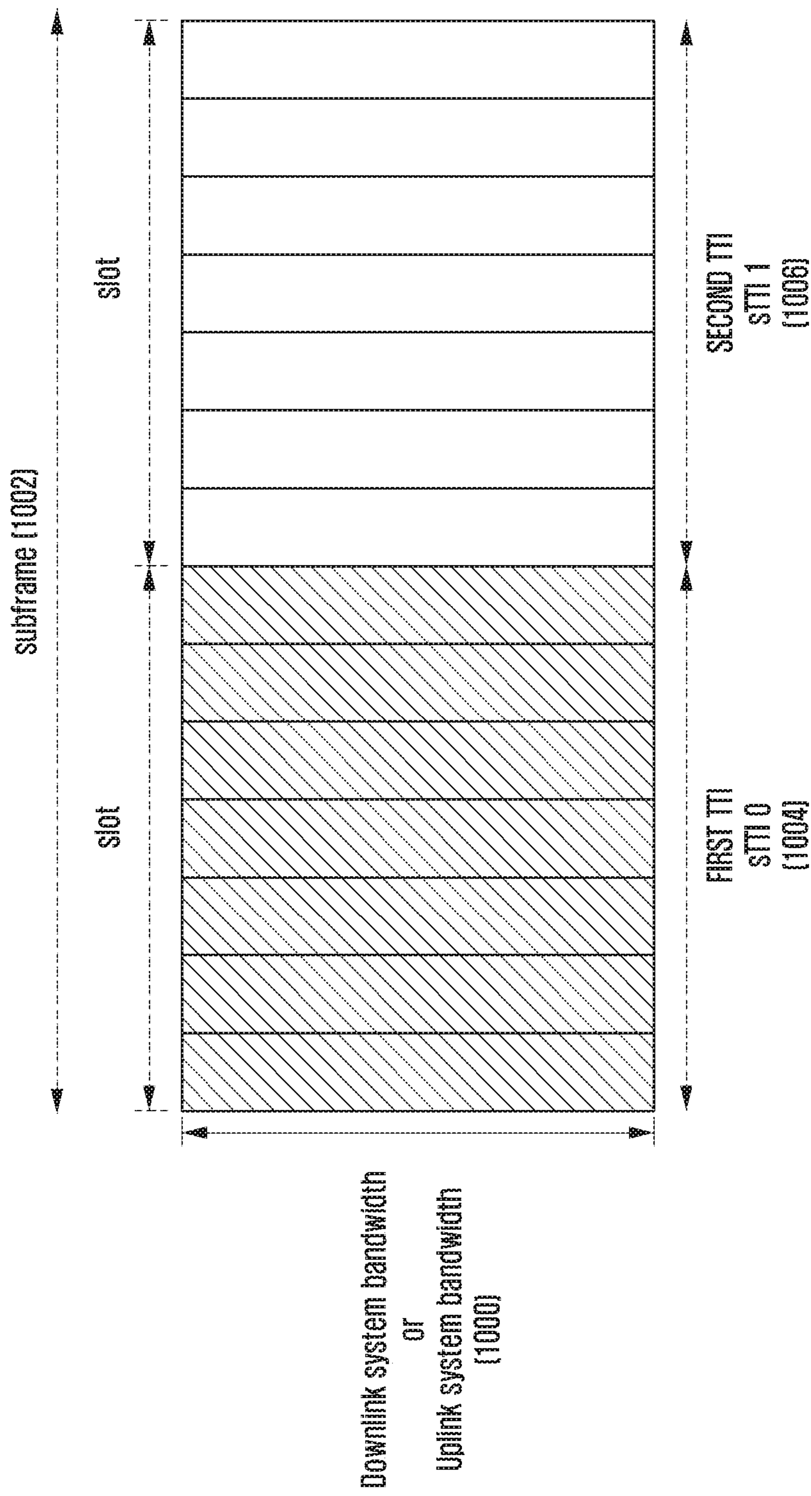
FIG. 10 is a diagram illustrating a pattern of sTTIs having a length of 7 symbols in DL and UL—according to embodiment of the disclosure.

FIG. 10 is a diagram illustrating a pattern of sTTIs having a length of 7 symbols in DL and UL according to an embodiment of the disclosure. The 14 symbols constituting a subframe 1002 are grouped by 7 into sTTI 0 1004 with the first 7 symbols and sTTI 1 1006 with the last 7 symbols.

In the following description, the shortened-TTI transmission is a scheme for transmitting a control signal, a data signal, or the control and data signals during a period shorter than 1 ms, and the normal-TTI transmission is a scheme for transmitting a control signal, a data signal, or the control and data signals during a period of 1 ms. A shortened-TTI UE may support both the shortened-TTI transmission and normal-TTI transmission or only the shortened-TTI transmission. The normal-TTI UE supports the normal-TTI transmission, but it does not support the shortened-TTI transmission. In the disclosure, the expression "for the shortened-TTI UE" may be interpreted as "for shortened TTI transmission" for convenience. If a normal-TTI and a longer-TTI are employed instead of the shortened-TTI and normal-TTI, the normal-TTI and the longer-TTI may be referred to as the shortened-TTI and normal-TTI, respectively, in the disclosure. In the disclosure, the terms, "shortened-TTI reception" and "normal-TTI reception" may be intended to indicate the procedures for receiving the signals transmitted with the shortened-TTI and normal-TTI, respectively.

In the following description, the TTI in DL denotes a transmission unit of the control and data signals or a transmission unit of the data signal. For example, in the legacy LTE system, the DL TTI is 1 ms corresponding to one subframe. Meanwhile, in the disclosure, the TTI in UL denotes a transmission unit of the control and data signals or a transmission unit of the data signal. In the legacy LTE system, however, the TTI in UL denotes a time duration of 1 ms corresponding to one subframe as in DL.

In the following description, the term "shortened-TTI mode" denotes an operation mode in which the UE or the eNB transmits and receives the control signal or the data signal by unit of shortened-TTI, and the term "normal-TTI mode" denotes an operation mode in which the UE or the eNB transmits and receives the control signal or the data signal by unit of normal-TTI.

In the following description, the term "shortened-TTI data" denotes the data being transmitted through a PDSCH or PUSCH by unit of shortened-TTI, and the term "normal-TTI data" denotes the data being transmitted through the PDSCH or PUSCH by unit of normal-TTI. In the following description, the term "DL control channel for shortened-TTI" denotes a physical channel for the control signal for a shortened-TTI mode operation and is referred to as sPDCCH, and the term "control signal for normal-TTI" denotes a control signal for a normal-TTI mode operation. Examples of the DL control channel for normal TTI may include the physical control format indicator channel (PCFICH), the physical channel HARQ indicator channel (PHICH), the PDCCH, and the EPDCCH for use in the legacy LTE system. In the following description, similarly, the UL control channel for shortened-TTI may be referred to as short PUCCH (sPUCCH) and include at least one of HARQ-ACK/NACK corresponding to DL data, channel status information, and a scheduling request.

In the following description, the terms "physical channel" and "physical signal" in use for the legacy LTE and LTE-A systems may be interchangeably referred to as data or control signal. For example, the PDSCH as a physical channel carrying normal-TTI data may be referred to as normal-TTI data in the disclosure, and the sPDSCH as a physical channel carrying shortened-TTI data may be referred to as shortened-TTI data in the disclosure. Likewise, the shortened-TTI data being transmitted in DL and UL may be referred to as sPDSCH and sPUSCH, respectively, in the disclosure.

As described above, the disclosure proposes an elaborated method for supporting both the legacy UE and shortened-TTI UE in the same system by defining the communication operations between the shortened-TTI UE and the eNB. The control information for the normal-TTI UE may be transmitted through a PDCCH mapped to up to three OFDM symbols of a subframe or an EPDCCH mapped to a predetermined resource block in a whole subframe. The shortened-TTI UE denotes a UE that is capable of transmitting and receiving a signal by unit of subframe as with the normal-TTI or by unit of resources smaller than a subframe.

In the following description, unless otherwise designated, the term "system" refers to an FDD system. However, the method and apparatus of the disclosure that are implemented for use in the FDD system may also be applied to a TDD system with slight modifications.

In the following description, the term "higher layer signaling" is used for transmitting a signal from an eNB to a UE through a physical DL data channel or from the UE to the eNB through a physical UL data channel and may be interchangeably referred to as radio resource control (RRC) signaling and MAC CE.

In the following description, unless otherwise specified, the term "UE" refers to a shortened-TTI UE. However, it will be clearly specified whether the terminal is a shortened-TTI UE or a normal-TTI UE in the context.

In the following description, the term "reference signal (RS)" denotes a signal agreed between the eNB and the UE for channel measurement, the result of which is used for receiving signals. In the following description, the terms "reference signal" and "RS" may be used interchangeably.

First Embodiment

Figure 11:
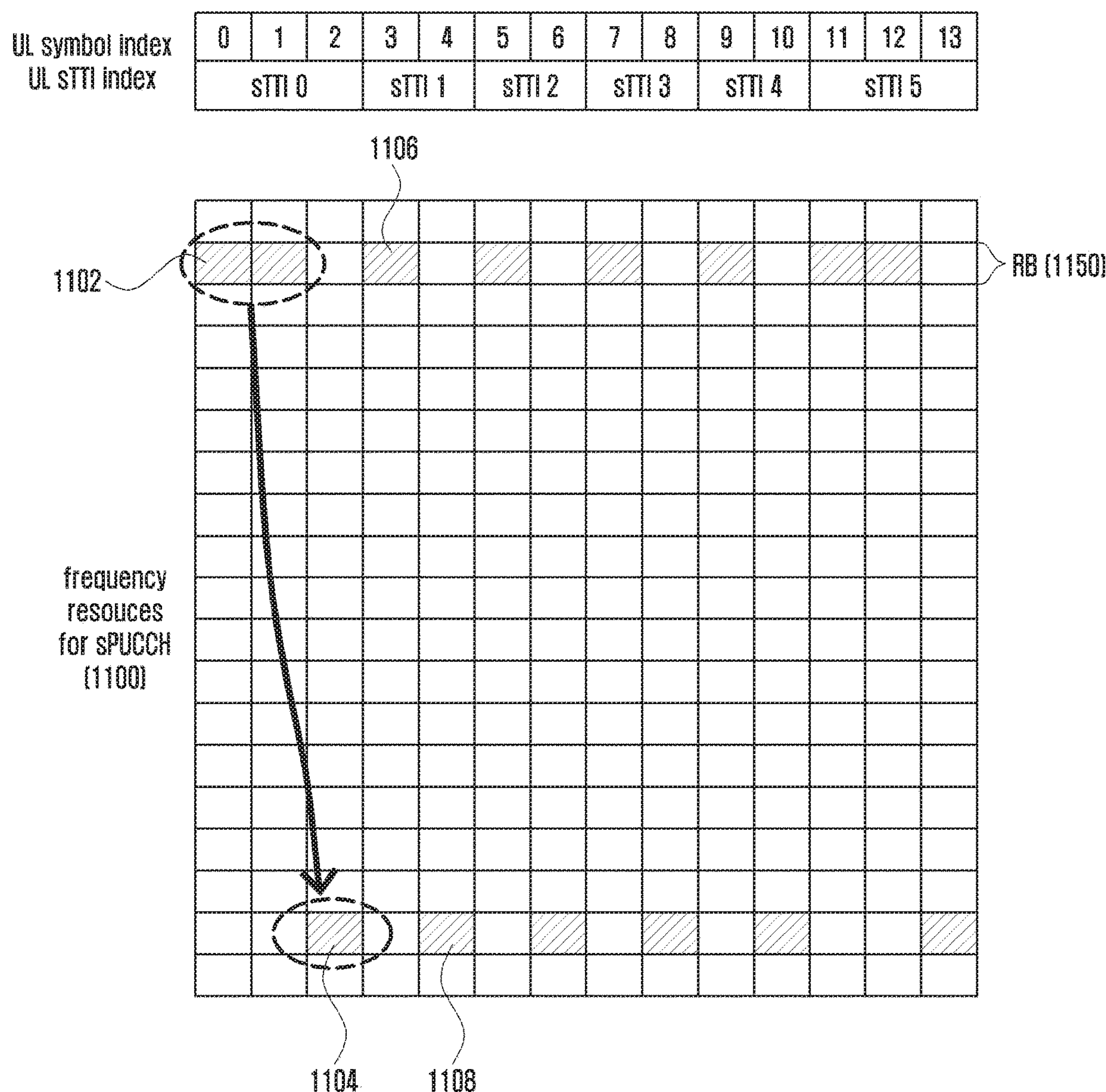
FIG. 11 is a diagram illustrating a resource grid for explaining frequency hopping within an sTTI having a length of 2 or 3 symbols for transmitting a UL control channel according to embodiment of the disclosure.
Figure 12:
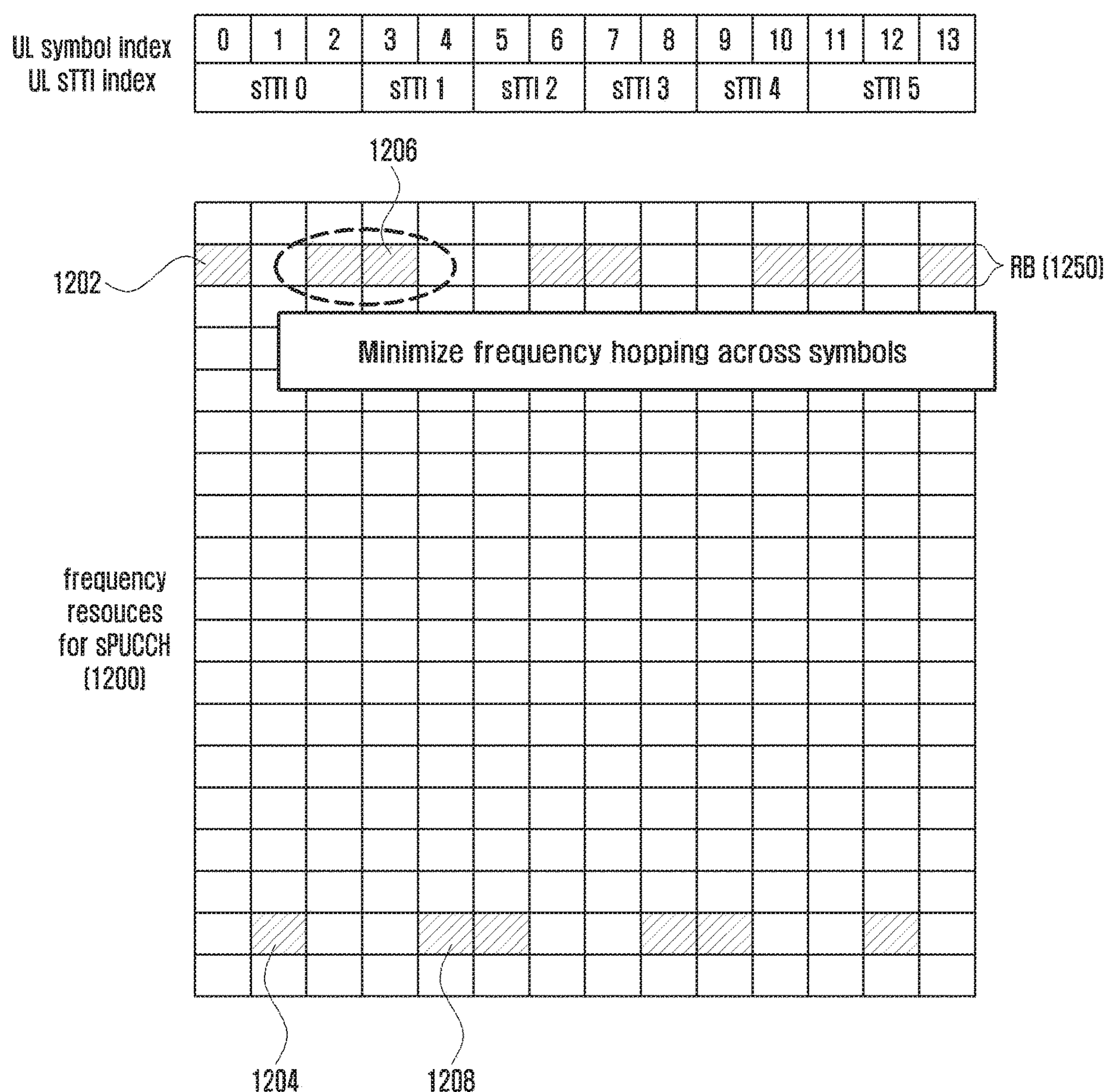
FIG. 12 is a diagram illustrating a resource grid for explaining frequency hopping within an sTTI having a length of 2 or 3 symbols for transmitting a UL control channel according to the first embodiment of the disclosure.

The first embodiment is directed to a frequency hopping scheme for use by a UE configured with an sTTI in transmitting a UL control channel (short PUCCH or sPUCCH) at an sTTI, and a description thereof is made with reference to FIGS. 11 and 12.

FIG. 11 is a diagram illustrating a resource grid for explaining frequency hopping within an sTTI having a length of 2 or 3 symbols for transmitting a UL control channel according to an embodiment of the disclosure. Assuming that the frequency region or whole system frequency region configured by the eNB is given as denoted by reference number 1100, the UL control channel for sTTI is mapped to RBs as denoted by reference numbers 1102, 1104, 1106, and 1108.

In the case where the UE that is allocated resources as shown in FIG. 11 transmits a control channel in consecutive sTTIs, it has to always perform frequency hopping every change of an sTTI index. In order for the UE to perform transmission at a scheduled power in a frequency hopping mode, there is a need of a power transient period for continuing transmission after changing the frequency band. The power transient period may be a few to a few dozen microseconds.

In this respect, it is preferable to minimize the number of frequency hoppings of the UE. The UE may use the frequency hopping pattern depicted in FIG. 12 instead of the frequency hopping pattern depicted in FIG. 11. FIG. 12 is a diagram illustrating a resource grid for explaining frequency hopping within an sTTI having a length of 2 or 3 symbols for transmitting a UL control channel according to another embodiment of the disclosure. The frequency hopping pattern depicted in FIG. 12 is characterized in that the UL control channel is transmitted in the same frequency region during the two consecutive OFDM/SC-FDMA symbols (crossing the boundary of two consecutive sTTIs), i.e., the last OFDM/SC-FDMA symbol of the first sTTI of the two consecutive sTTI and the first OFDM/SC-FDMA symbol of the second sTTI have same frequency region for transmitting the UL control channel. As denoted by reference number 1206, the UL control signal is mapped, in the same frequency region, to the symbol indicated by symbol index 2 that belongs to the sTTI indicated by sTTI index 0 and the symbol indicated by symbol index 3 that belongs to the sTTI indicated by sTTI index 1.

The eNB may notify the UE of such a frequency hopping pattern for transmitting sPUCCH in the same PRB region through physical layer signaling or higher layer signaling. It may also be possible that an agreement is made to use an indicator for indicating the use of the pattern as shown in FIG. 12 per subframe.

Assuming that that the index of the PRB or the first or last index of the PRBs to which the sPUCCH is mapped is $n_{PRB}^{sPUCCH}$, $n_{PRB}^{sPUCCH}$ may be determined based on a value transmitted via a physical layer indicator or high layer signaling. Assuming that the value transmitted via the physical layer indicator or high layer signal is m, $n_{PRB}^{sPUCCH}$ may be calculated using m as follows:

$$n_{PRB}^{sPUCCH} = \begin{cases} m & forsTTI0, 1, 3, 5 \\ N_{RB}^{UL} - 1 - m & forsTTI2, 4 \end{cases} \quad \text{Equation 1}$$

As another example, $n_{PRB}^{sPUCCH}$ may be determined based on the OFDM/SC-FDMA symbol index 1 in a subframe.

$$n_{PRB}^{sPUCCH} = \begin{cases} m & ifl = 0, 2, 3, 6, 7, 10, 11, 13 \\ N_{RB}^{UL} - 1 - m & ifl = 1, 4, 5, 8, 9, 12 \end{cases} \quad \text{Equation 2}$$

In the above equations, m is a value obtained based on any combination of DCI for DL scheduling, MAC CE, and RRC signaling transmitted from the eNB to the UE. In the above equations, $N_{RB}^{UL}$ may denote a number PRBs of the UL system frequency band.

Second Embodiment

The second embodiment is directed to a method for detecting sDCI (hereinafter, interchangeable referred to as short DCI, short TTI DCI, and DCI) including UL scheduling information within a subframe in consideration of a DL sTTI index and HARQ timing, and a description thereof is made with reference to FIG. 13.

The number of cases of RS transmission may vary depending on the UL sTTI index. In the case of the 2-symbol sTTI, the RS position may fall at the first or second symbol of the corresponding sTTI, the last symbol of the sTTI followed by the corresponding sTTI, or the first symbol of the sTTI following the corresponding sTTI. In the case of the 3-symbol sTTI, the RS position may fall at the first, second, or third symbol of the corresponding sTTI, the last symbol of the sTTI followed by the corresponding sTTI, or the first symbol of the sTTI following the corresponding sTTI. However, it is not always possible to map the RS to the aforementioned symbols in the case of using the 2-symbol or 3-symbol sTTI; the RS positions may be pre-agreed between the eNB and the terminal or notified through high layer signaling. The symbols to which the RS can be mapped in the 2-symbol or 3-symbol sTTI may be predetermined according to the sTTI index.

Accordingly, the bitwidth necessary for indicating the symbol position to which the RS is mapped according to the sTTI index may be changed. For example, it may be possible to consider a case where the RS can be mapped to the first or third symbol of the first sTTI, i.e., sTTI 0, of a subframe and a case where the RS can be mapped to the first or second symbol of the second sTTI, i.e., sTTI 1, of a subframe or the first symbol of the next sTTI, or the RS is not transmitted. In the above example, the number of cases of the RS position is 2 for sTTI 0 and 4 for sTTI 1. This means that 1 bit is necessary for the UL RS transmission information in DCI for UL data transmission scheduling for the case of sTTI 0. Meanwhile, 2 bits are necessary for the UL RS transmission information in DCI for UL data transmission scheduling for the case of sTTI 1.

An approach for configuring the UL RS is to assign 2 fixed bits for the UL RS transmission information in the UL scheduling DCI regardless of the sTTI index; use one of the 2 fixed bits for scheduling in sTTI 0, while retaining the unused bit as a reserved bit. Another approach is to change the number of bits for the UL RS information in the DCI depending on the sTTI index of the sTTI carrying UL data. In this case, the DCI is configured to have 1 bit for UL RS transmission information in scheduling a UL data transmission in sTTI 0 and 2 bits for UL RS transmission in scheduling a UL data transmission in sTTI 1. In this case, the UE has to perform DCI decoding to obtain the configuration information in consideration of the sTTI index of the sTTI carrying the UL data in the procedure of attempting to decode DCI for UL sTTI scheduling.

The eNB may configure DCI in consideration of the sTTI index of the sTTI for UL data transmission, and the UE may attempt to decode the DCI in consideration of the scheduling timing as well as the sTTI index of the sTTI carrying the UL data. The UL transmission timing may be pre-agreed between the eNB and the UE or notified from the eNB to the UE through high layer signaling in association with the receipt of the UL scheduling DCI, or indicated by partial or whole timing information included in the UL scheduling DCI.

Figure 13:
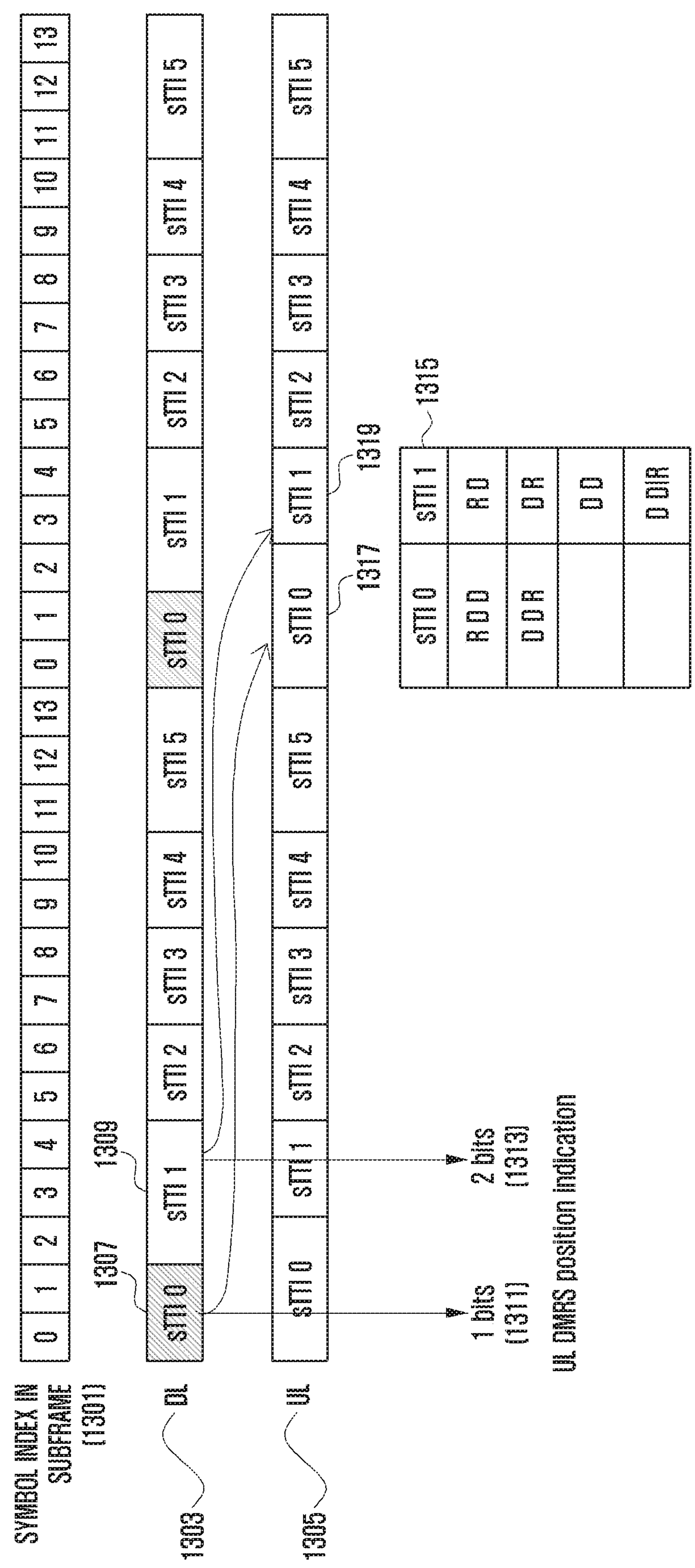
FIG. 13 is a diagram for explaining a number of bits of a bit-field for indicating UL RS (or demodulation reference signal DMRS) positions in association with an sTTI index in a pattern of sTTIs each having a length of two or three symbols according to the second embodiment of the disclosure.

FIG. 13 is a diagram illustrating a method for transmitting/receiving DCI according to an embodiment of the disclosure. The symbols 1301 constituting a subframe are grouped by two or three in a DL sTTI pattern 1303 and a UL sTTI pattern 1305. In FIG. 13, the UL scheduling DCI or sDCI is transmitted in sTTI 0 1307, and the corresponding UL data transmission is performed in sTTI 0 1317 of the next subframe, i.e., 6 sTTIs after the sTTI 0 1307. Also, the UL scheduling DCI or sDCI is transmitted in sTTI 1 1309, and the corresponding UL data transmission is performed in sTTI 1 1319, i.e., 6 sTTIs after the sTTI 0 1309.

In the embodiment of FIG. 13, it may be signaled through higher layer signaling or may be pre-agreed that the sTTI-based UL data transmission timing falls in the sTTI after 6 sTTIs from the sTTI carrying the DCI or sDCI. In FIG. 13, it may be configured that the RS is mapped to only one of the first and last symbols in sTTI 0 1317 when UL data is transmitted in the sTTI 0 1317, and the RS is mapped to none, first, second, or last symbol of sTTI 1 1319, or the first symbol of the next sTTI when UL data is transmitted in the sTTI 1 1319.

In table 1315 of FIG. 13, R denotes a symbol to which an RS is mapped, and D denotes a symbol to which data is mapped. This means that 1 bit is necessary for transmitting the RS symbol indication information for sTTI 0 1317, while 2 bits are necessary for transmitting the RS symbol indication information for sTTI 1 1319. Accordingly, the DCI or sDCI for UL scheduling in sTTI 0 1317 includes a 1-bit field for indicating the symbol carrying the RS as denoted by reference number 1311. Meanwhile, the DCI or sDCI for UL scheduling in sTTI 1 1319 includes a 2-bit field for indicating the symbols carrying the RS as denoted by reference number 1313.

Third Embodiment

Figure 14:
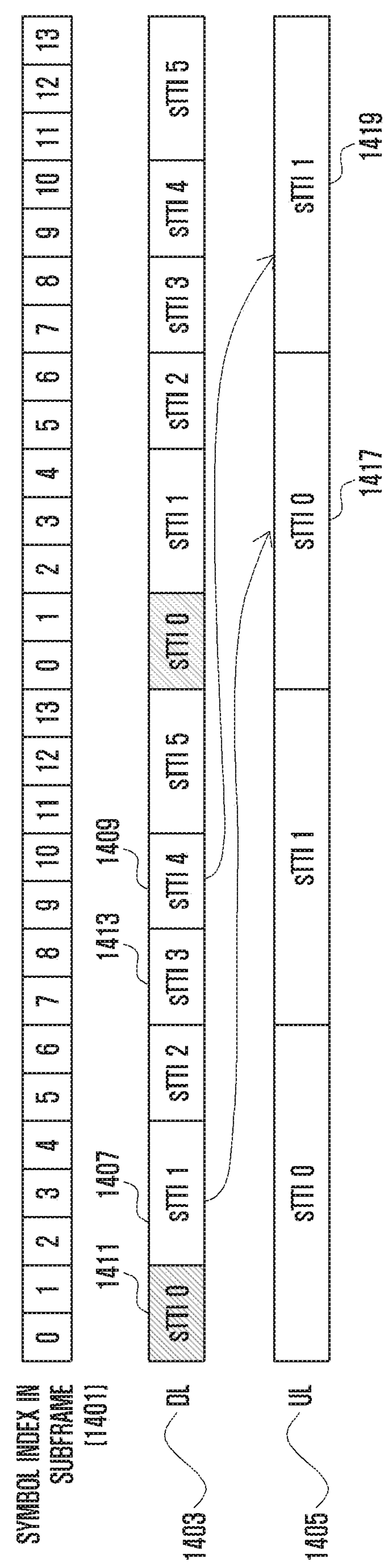
FIG. 14 is a diagram illustrating a method for a UE to determine whether to perform control information decoding in an sTTI index-specific manner according to the third embodiment of the disclosure.

The third embodiment is directed to a method for a UE to decode DCI transmitted by an eNB when the DL sTTIs are configured to have a length of 2 or 3 symbols each and the UL sTTIs are configured to have a length of 7 symbols or a slot, and a description thereof is made with reference to FIG. 14.

In the case where the DL sTTIs have a length of 2 or 3 symbols each, a subframe may consist of 6 sTTIs. In the case where the UL sTTIs have a length of 7 symbols or a slot each, a subframe consists of 2 sTTIs. Accordingly, the number of DL sTTIs for use in transmitting DCI or sDCI including the UL data scheduling information per UL sTTI may be one or more. If all of the DL sTTIs within one subframe can be used for transmitting the DCI or sDCI carrying the UL scheduling information, the UE has to attempt DCI or sDCI decoding in every sTTI to obtain the UL scheduling information.

In this embodiment, it is possible to reduce the number of control information decoding attempts of the UE by restricting the DL sTTIs carrying DCI or sDCI including UL scheduling information. The indices of the DL sTTIs carrying the DCI or sDCI including the UL scheduling information may be pre-agreed between the eNB and the UE or transmitted from the eNB to the UE through higher layer signaling. In this case, the UE does not perform a DCI or sDCI decoding attempt in the sTTIs with the exception of the DL sTTI carrying the DCI or sDCI including the UL scheduling information.

FIG. 14 is a diagram illustrating a method for a UE to determine whether to perform control information decoding in a sTTI index-specific manner according to an embodiment of the disclosure. In this embodiment, the DL sTTIs have a length of 2 or 3 symbols each, and the UL sTTIs have a length of 7 symbols. The symbols 1401 are grouped in a DL sTTI pattern 1403 and in a UL sTTI pattern 1405. In the embodiment of FIG. 14, the UL scheduling DCI or sDCI is transmitted in sTTI 1407, and the corresponding UL data transmission is performed in sTTI 0 1417 as the first slot of the next subframe. Also, the UL scheduling DCI or sDCI is transmitted in sTTI 4 1409, and the corresponding UL data transmission is performed in sTTI 1 1419 as the second slot of the next subframe. In an case where the DL sTTIs have a length of 2 or 3 symbols each and the UL sTTIs have a length of 7 symbols or a slot each, the DCI or sDCI including UL data transmission scheduling information is transmitted only in the DL sTTIs 1 and 4. In another case where the DL sTTIs have a length of 2 or 3 symbols each and the UL sTTIs have a length of 7 symbols or a slot each, the eNB and the UE may know that the DCI or sDCI including UL data transmission information is transmitted only in DL sTTI 0 1411 and DL sTTI 3 1413. The eNB may transmit to the UE the indices of the sTTIs carrying the UL scheduling information through high layer signaling.

Fourth Embodiment

The fourth embodiment is directed to a method for a UE to decode DCI transmitted by an eNB when the DL sTTIs are configured to have a length of 2 or 3 symbols each and the UL sTTIs are configured to have a length of 7 symbols or a slot.

In the case where the DL sTTIs have a length of 2 or 3 symbols each, a subframe may consist of 6 sTTIs. In the case where the UL sTTIs have a length of 7 symbols or a slot each, a subframe consists of 2 sTTIs. Accordingly, the number of DL sTTIs for use in transmitting DCI or sDCI including the UL data scheduling information per UL sTTI may be one or more.

Figure 15:
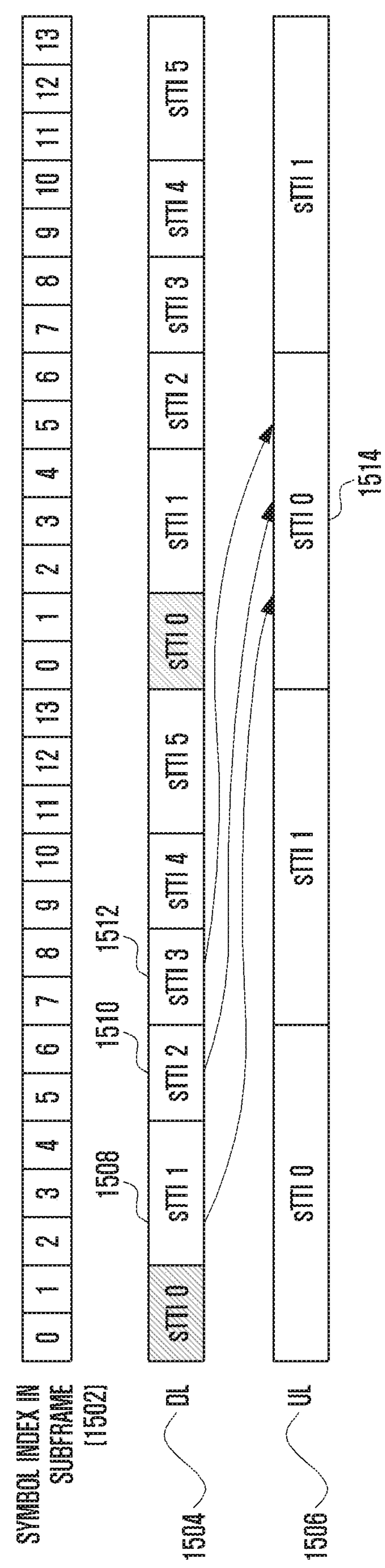
FIG. 15 is a diagram illustrating a method of transmitting information for scheduling UL data transmission in a UL sTTI using multiple DL sTTIs according to the fourth embodiment of the disclosure.

FIG. 15 is a diagram illustrating a method of transmitting information for scheduling UL data transmission in a UL sTTI using multiple DL sTTIs according to an embodiment of the disclosure. The DL sTTIs 1504 and UL sTTIs 1506 are defined with symbol indices 1502 of the symbols constituting subframes. In the embodiment of FIG. 15, the control information for scheduling data transmission in the UL sTTI 0 of the next subframe is transmitted in the DL sTTI 1 1508, DL sTTI 2 1510, and DL sTTI 3 1512. If the UE receives the UL data scheduling information in two or more sTTIs among the DL sTTI 1 1508, DL sTTI 2 1510, and DL sTTI 3 1512 and the UL data scheduling information being transmitted for scheduling UL transmission is in UL sTTI 0 1514, it may perform UL data transmission based on the scheduling information received in the latest sTTI. For example, if the UE receives the information for scheduling data transmission in the UL sTTI 0 1514 at sTTI 0 1505 and sTTI 3 1512, it may perform the UL data transmission based on the UL scheduling information received at the sTTI 3 1512. For example, if the UE receives the information for scheduling data transmission in UL sTTI 0 1514 at sTTI 0 1508 and sTTI 3 1512, it may perform UL data transmission based on the scheduling information received first, i.e., in sTTI 0 1508.

Figure 16:
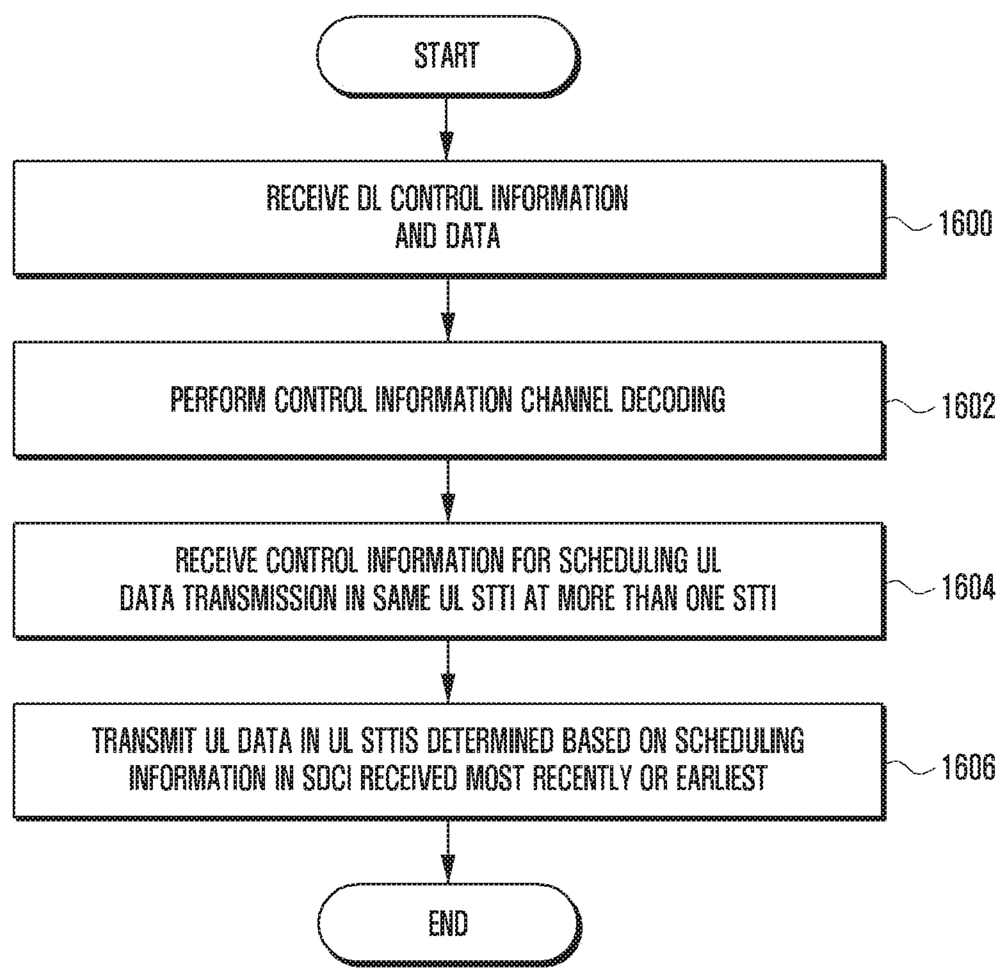
FIG. 16 is a flowchart illustrating a UE operation according to the fourth embodiment of the disclosure.

FIG. 16 is a flowchart illustrating a UE operation according to an embodiment of the disclosure. If the UE receives DL control information and data at operation 1600, it may perform DL control information channel decoding at operation 1602 and receive control information for scheduling data transmission in the same UL sTTI at more than one sTTI at operation 1604. The UE transmits UL data based on the scheduling information included in the sDCI received most recently or earliest at operation 1606.

Fifth Embodiment

The fifth embodiment is directed to an operation method and apparatus of a UE configured with a short processing time (SPT) upon receipt of control information including a UL grant in an LTE TDD system using a TTI of 1 ms according to an embodiment of the disclosure.

In this embodiment, if the SPT is configured, this may mean that the UE that receives a UL grant at the $n^{th}$ subframe can transmit UL data at the $(n+3)^{th}$ subframe under the assumption of using the TTI of 1 ms. The SPT may be configured to the UE supporting an SPT mode. In the LTE TDD system, if the UE receives scheduling information including an UL grant at the $n^{th}$ subframe, it can transmit the scheduled UL data at the $(n+k)^{th}$ subframe, where k is determined according to a TDD UL/DL configuration and a subframe index. The value of k is determined by referencing Table 2 for a UE to which the SPT is configured and data transmission at an UL pilot time slot (UpPTS) is not configured and Table 3 for a UE to which SPT is configured and data transmission at the UpPTS is configured.

TABLE 2

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 3 | 3 | | | | 3 | 3 | | | |
| 1 | 3 | | | | 3 | 3 | | | | 3 |
| 2 | | | | | 3 | | | | | 3 |
| 3 | 3 | 3 | | | | | | | | 3 |
| 4 | 3 | | | | | | | | | 3 |
| 5 | | | | | | | | | | 3 |
| 6 | 4 | 6 | | | | 3 | 6 | | | 4 |

TABLE 3

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 3 | 3 | | | | 3 | 3 | | | |
| 1 | 3 | 5 | | | 3 | 3 | 5 | | | 3 |
| 2 | | | | 3 | 3 | | | | 3 | 3 |
| 3 | 3 | 3 | | | | | | | 3 | 3 |
| 4 | 3 | | | | | | | | 3 | 3 |
| 5 | | | | | | | | | 3 | 3 |
| 6 | 3 | 5 | | | | 3 | 5 | | | 3 |

In the case of using TDD UL/DL configurations 0 and 6, the UE may receive UL index information included in DCI carrying the UL grant. If both the most significant bit (MSB) and least significant bit (LSB) of the received UL index are set to 1, the UE transmits a PUSCH in two subframes in association with the DCI. The two subframes are $(n+k)^{th}$ and $(n+k_p)^{th}$ subframes, where k may be obtained from the above tables and $k_p$ may be separately defined. For example, $k_p$ may be set to 6.

For example, in the case of using the TDD UL/DL configuration 0, if the UE receives the DCI at subframe 1, the UE transmits the PUSCH at the $(n+3)^{th}$ and $(n+6)^{th}$ subframes, i.e., subframes 4 and 7 under the assumption of n=1 in this embodiment. In this case, a problem occurs in relation to which HARQ process ID is assigned to the two PUSCHs because DCI is indicative of one HARQ process ID value.

In this embodiment, assuming that the HARQ process ID indicated by the DCI is $n_{HARQ\_ID}$, it may be configured that the HARQ process ID for the PUSCH being transmitted in the $(n+k)^{th}$ subframe is $n_{HARQ\_ID}$, and the HARQ process ID for the PUSCH being transmitted in the $(n+k_p)^{th}$ subframe is $(n_{HARQ\_ID}+1)\mathrm{mod}M_{UL\_HARQ}$, in association with one UL grant. Here, A mod B denotes a remainder obtained by dividing A by B, and $M_{UL\_HARQ}$ denotes the maximum number of HARQ processes for UL data transmission, i.e., PUSCH transmission. The $M_{UL\_HARQ}$ may be a fixed value of 8 or a variable varying according to the TDD UL/DL configuration.

Sixth Embodiment

The sixth embodiment is directed to an operation method and apparatus of a UE configured with a short-TTI of 0.5 ms equal to the length of a slot upon receipt of control information including a UL grant in an LTE TDD system according to an embodiment of the disclosure.

In the LTE TDD system, if the UE receives scheduling information including a UL grant at the $n^{th}$ slot in a subframe, it can transmit the scheduled UL data at the $(n+k)^{th}$ slot, where k is determined according to the TDD UL/DL configuration and a slot index. The value of k is determined by referencing Table 4 for a UE configured with the short TTI length and without data transmission at a UpPTS for the case of using a special subframe configuration 1, 2, 3, 4, 6, 7, or 8; Table 5 for the UE configured with the short TTI length and without data transmission at the UpPTS for the case of using a special subframe configuration 0, 5, or 8; and Table 6 for the UE configured with the short TTI length and data transmission at the UpPTS.

TABLE 4

| TDD UL/DL | subframe number n | | | | | | | | | | | | | | | | | | | |
|---|---|---|---|---|---|---|---|---|---|---|---|---|---|---|---|---|---|---|---|---|
| Configuration | 0 | 1 | 2 | 3 | 4 | 5 | 6 | 7 | 8 | 9 | 10 | 11 | 12 | 13 | 14 | 15 | 16 | 17 | 18 | 19 |
| 0 | 4 | 4 | 4 | 5 | | | | | | | 4 | 4 | 4 | 5 | | | | | | |
| 1 | 4 | 4 | 4 | 4 | | | | | | | 4 | 4 | 4 | 4 | | | | | | |

TABLE 4-continued

| TDD UL/DL | subframe number n | | | | | | | | | | | | | | | | | | | |
|---|---|---|---|---|---|---|---|---|---|---|---|---|---|---|---|---|---|---|---|---|
| Configuration | 0 | 1 | 2 | 3 | 4 | 5 | 6 | 7 | 8 | 9 | 10 | 11 | 12 | 13 | 14 | 15 | 16 | 17 | 18 | 19 |
| 2 | 4 | 4 | | | | | | | | | 4 | 4 | | | | | | | | |
| 3 | 6 | 6 | 6 | 6 | | | | | | | | | | | | | | | 6 | 6 |
| 4 | 4 | 4 | 4 | 4 | | | | | | | | | | | | | | | | |
| 5 | 4 | 4 | | | | | | | | | | | | | | | | | | |
| 6 | 6 | 6 | 6 | 6 | | | | | | | 4 | 4 | 4 | 4 | | | | | 6 | 6 |

TABLE 5

| TDD UL/DL | subframe number n | | | | | | | | | | | | | | | | | | | |
|---|---|---|---|---|---|---|---|---|---|---|---|---|---|---|---|---|---|---|---|---|
| Configuration | 0 | 1 | 2 | 3 | 4 | 5 | 6 | 7 | 8 | 9 | 10 | 11 | 12 | 13 | 14 | 15 | 16 | 17 | 18 | 19 |
| 0 | 4 | 5 | 6 | | | | | | | | 4 | 5 | 6 | | | | | | | |
| 1 | 5 | 5 | 5 | | | | | | | 5 | 5 | 5 | 5 | | | | | | | 5 |
| 2 | 4 | 4 | | | | | | | | | 4 | 4 | | | | | | | | |
| 3 | 7 | 7 | 7 | | | | | | | | | | | | | | | 7 | 7 | 7 |
| 4 | 5 | 5 | 5 | | | | | | | | | | | | | | | | | 5 |
| 5 | 4 | 4 | | | | | | | | | | | | | | | | | | |
| 6 | 4 | 5 | 6 | | | | | | | | 4 | 4 | 4 | | | | | | | |

TABLE 6

| TDD UL/DL | subframe number n | | | | | | | | | | | | | | | | | | | |
|---|---|---|---|---|---|---|---|---|---|---|---|---|---|---|---|---|---|---|---|---|
| Configuration | 0 | 1 | 2 | 3 | 4 | 5 | 6 | 7 | 8 | 9 | 10 | 11 | 12 | 13 | 14 | 15 | 16 | 17 | 18 | 19 |
| 0 | 4 | 5 | 6 | | | | | | | | 4 | 5 | 6 | | | | | | | |
| 1 | 5 | 5 | 5 | | | | | | 5 | 5 | 5 | 5 | 5 | | | | | | 5 | 5 |
| 2 | 4 | 4 | | | | | | | | 4 | 4 | 4 | | | | | | | | 4 |
| 3 | 7 | 7 | 7 | | | | | | | | | | | | | | 7 | 7 | 7 | 7 |
| 4 | 5 | 5 | 5 | | | | | | | | | | | | | | | | 5 | 5 |
| 5 | 4 | 4 | | | | | | | | | | | | | | | | | | 4 |
| 6 | 4 | 5 | 6 | | | | | | | | 4 | 4 | 4 | | | | | | | 4 |

In the case where the TDD UL/DL configuration 0 or 6 of Tables 4 and 5 is configured, i.e., data transmission at the UpPTS is not configured to the UE, the UE may receive a UL index included in the DCI carrying the UL grant by the unit of sTTI, i.e., one slot. If both the MSB and LSB of the received UL index are set to 1, the UE transmits a PUSCH in two slots in association with the DCI. The two slots are $(n+k)^{th}$ and $(n+k+1)^{th}$ slots, where k may be obtained from the above Tables 4 and 5. In the case of the TDD UL/DL configuration 0 or 6 of Table 6, this method can be applied to all slots with the exception of slots 2 and 12. In this case, a problem occurs in relation to which HARQ process ID is assigned to the two PUSCHs because DCI is indicative of one HARQ process ID value.

In this embodiment, assuming that the HARQ process ID indicated by the DCI is $n_{HARQ\_ID}$, it may be configured that the HARQ process ID for the PUSCH being transmitted in the $(n+k)^{th}$ slot is $n_{HARQ\_ID}$, and the HARQ process ID for the PUSCH being transmitted in the $(n+k_p)^{th}$ slot is $(n_{HARQ\_ID}+1) \bmod M_{UL\_HARQ}$, in association with one UL grant. Here, A mod B denotes a remainder obtained by dividing A by B, and $M_{UL\_HARQ}$ denotes the maximum number of HARQ processes for UL data transmission, i.e., PUSCH transmission. The $M_{UL\_HARQ}$ may be a fixed value of 16 or a variable varying according to the TDD UL/DL configuration. That is, it may be pre-agreed that the HARQ process ID for the PUSCH being transmitted in the $(n+k+1)^{th}$ slot is $(n_{HARQ\_ID}+1) \bmod 16$.

In the case where the TDD UL/DL configuration 0 or 6 of Table 6 is configured, data transmission at slots 2 and 12, i.e., UpPTS, is not configured to the UE, and the UE may receive the UL index information included in the DCI carrying the UL grant by the unit of sTTI, i.e., one slot. Here, the UE may transmit PUSCHs according to the values of the MSB and LSB of the received UL index. For example, the UE transmits the PUSCH at $(n+k+1)^{th}$ slot for the case of the UL index set to “10”, $(n+k+5)^{th}$ slot for the case of the UL index set to “11”, and $(n+k)^{th}$, $(n+k+1)^{th}$, and $(n+k+5)^{th}$ slots for the case of the UL index set to “00”. In this case, a problem may occur in relation to which HARQ process ID is assigned to the three PUSCHs because DCI is indicative of one HARQ process ID value.

In this embodiment, assuming that the HARQ process ID indicated by the DCI is $n_{HARQ\_ID}$, it may be configured that the HARQ process ID for the first PUSCH being transmitted in the $(n+k)^{th}$ slot is $n_{HARQ\_ID}$, the HARQ process ID for the second PUSCH being transmitted in the (n+k+1)th slot is $(n_{HARQ\_ID}+1) \bmod M_{UL\_HARQ}$, and the HARQ process ID for the third PUSCH being transmitted in the $(n+k+5)^{th}$ slot is $(n_{HARQ\_ID}+2) \bmod M_{UL\_HARQ}$, in association with one UL grant. Here, A mod B denotes a remainder obtained by dividing A by B, and $M_{UL\_HARQ}$ denotes the maximum number of HARQ processes for UL data transmission, i.e., PUSCH transmission. The $M_{UL\_HARQ}$ may be a fixed value of 16 or a variable varying according to the TDD UL/DL configuration. That is, it may be pre-agreed that the HARQ process IDs for the PUSCHs being transmitted in the $(n+k+1)^{th}$ and $(n+k+5)^{th}$ slots are $(n_{HARQ_ID}+1)$mod 16 and $(n_{HARQ_ID}+2)$mod 16, respectively.

Figure 17:
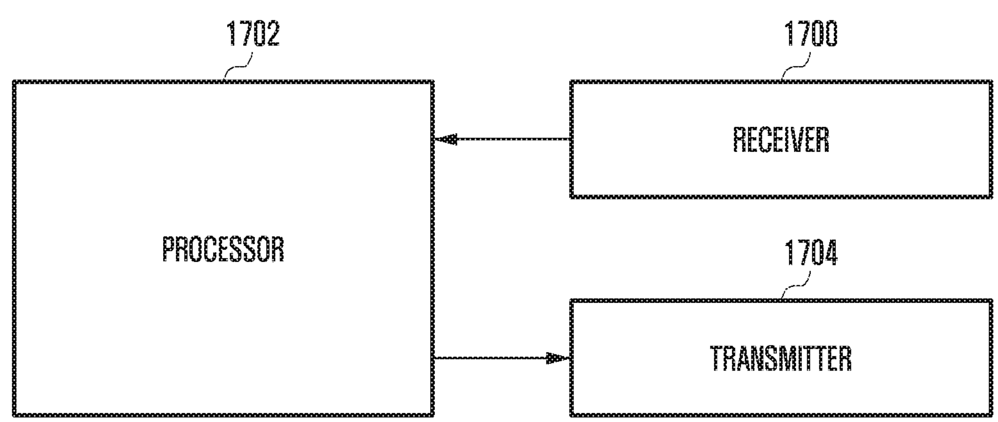
FIG. 17 is a block diagram illustrating a configuration of a UE according to an embodiment of the disclosure.
Figure 18:
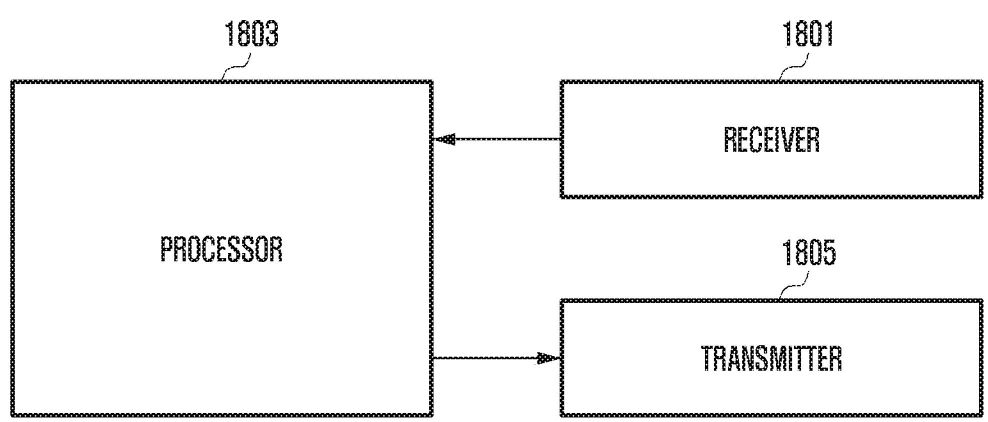
FIG. 18 is a block diagram illustrating a configuration of an eNB according to an embodiment of the disclosure.

A UE and an eNB that are each configured with a transmitter, a receiver, and a processor of an embodiment are depicted in FIGS. 17 and 18, respectively. In order to accomplish the transmission/reception methods according to the first to sixth embodiments, the receiver, processor, and transmitter of each of the eNB and the UE have to operate as specified in the individual embodiments.

FIG. 17 is a block diagram illustrating a configuration of a UE according to an embodiment of the disclosure. As shown in FIG. 7, the UE according to an embodiment of the disclosure includes a receiver 1700, a transmitter 1704, and a processor 1702. The receiver 1700 and the transmitter 1704 may be collectively referred to as a transceiver in an embodiment of the disclosure. The transceiver may transmit and receive a signal to and from an eNB. Examples of the signal may include control information and data. In order to transmit and receive the signal, the transceiver may include a radio frequency (RF) transmitter for performing frequency up-conversion and amplification on the signal to be transmitted and an RF receiver for performing low-noise amplification and frequency down-conversion on the received signal. The transceiver may output the signal received over a radio channel to the processor 1702 and transmit a signal output from the processor through the radio channel. The processor 1702 may control the UE to operate as specified in the embodiments of the disclosure. For example, the processor 1702 may control the receiver 1700 to receive a signal from an eNB, the signal including information indicating whether to omit RS transmission or RS symbol position, check the signal for a number of cases of RS transmission, and determine whether to perform DL control signal decoding. Afterward, the transmitter 1704 transmits an RS or UL data without any RS signal at symbol positions designated based on the received information.

FIG. 18 is a block diagram illustrating a configuration of an eNB according to an embodiment of the disclosure. As shown in FIG. 18, the eNB according to an embodiment of the disclosure includes a receiver 1801, a transmitter 1805, and a processor 1803. The receiver 1801 and the transmitter 1805 may be collectively referred to as a transceiver in an embodiment of the disclosure. The transceiver may transmit and receive a signal to and from a UE. Examples of the signal may include control information and data. In order to transmit and receive the signal, the transceiver may include an RF transmitter for performing frequency up-conversion and amplification on the signal to be transmitted and an RF receiver for performing low-noise amplification and frequency down-conversion on the received signal. The transceiver may output the signal received over a radio channel to the processor 1803 and transmit a signal output from the processor through the radio channel. The processor 1803 may control the eNB to operate as specified in the embodiments of the disclosure. For example, the processor 1803 may generate control information including information indicating whether to omit RS transmission or RS symbol position, the control information being generated according to the number of symbol positions available for RS transmission. Afterward, the transmitter 1805 transmits the control signal, and the receiver 1801 receives the UL data transmitted according to the configuration.

As described above, the short TTI-based transmission and reception method and apparatus of the disclosure is advantageous in terms of reducing transmission and reception delay of the base station and terminal by supporting use of a shortened TTI and in terms of reducing power consumption of the terminal by decreasing a number of control information decoding times in such a way of facilitating operation efficiency of the base station and terminal.

Although preferred embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure. If necessary, the embodiments may be combined in whole or in part. For example, embodiments 1 and 3 of the disclosure may be combined to form an embodiment for the operations of a base station and a terminal. Although the embodiments are directed to an LTE system, it is obvious to apply them to other systems such as a 5G system or an NR system to form other alternative embodiments without departing from the spirit and scope of the disclosure.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a wireless communication system, the method comprising:

receiving configuration information on a shortened transmission time interval (sTTI);

transmitting uplink control information on a short physical uplink control channel (SPUCCH);

receiving downlink control information scheduling uplink data in a downlink sTTI; and transmitting the uplink data on an uplink sTTI, wherein, in a case that the uplink sTTI includes 7 symbols and the downlink sTTI includes 2 or 3 symbols, the downlink sTTI in which the downlink control information is received is included in a set of predetermined downlink sTTIs, wherein the set of predetermined downlink sTTIs is determined based on whether the uplink data is transmitted in an uplink sTTI of index 0 or an uplink sTTI of index 1, and wherein, in a case that the uplink control information is transmitted on sTTIs of index n and n+1 and uplink sTTIs include 2 or 3 symbols, a frequency resource of a last symbol of the sTTI of index n and a frequency resource of a first symbol of the sTTI of index n+1 are the same.

2. The method of claim 1, wherein the set of predetermined downlink sTTIs includes a downlink sTTI of index 0 in a case that the uplink data is transmitted in the uplink sTTI of index 0.

3. A method of a base station in a wireless communication system, the method comprising:

transmitting configuration information on a shortened transmission time interval (sTTI);

receiving uplink control information on a short physical uplink control channel (SPUCCH);

transmitting downlink control information scheduling uplink data on a downlink sTTI; and receiving the uplink data on an uplink sTTI, wherein, in a case that the uplink sTTI includes 7 symbols and the downlink sTTI includes 2 or 3 symbols, the downlink sTTI in which the downlink control information is transmitted is included in a set of predetermined downlink sTTIs, wherein the set of predetermined downlink sTTIs is determined based on whether the uplink data is transmitted in an uplink sTTI of index 0 or an uplink sTTI of index 1, and wherein, in a case that the uplink control information is received on sTTIs of index n and n+1 and uplink sTTIs include 2 or 3 symbols, a frequency resource of a last symbol of the sTTI of index n and a frequency resource of a first symbol of the sTTI of index n+1 are the same.

4. The method of claim 3, wherein the set of predetermined downlink sTTIs includes a downlink sTTI of index 0 in a case that the uplink data is received in the uplink sTTI of index 0.

5. A terminal in a wireless communication system, the terminal comprising:

a transceiver; and a processor coupled with the transceiver and configured to:

receive configuration information on a shortened transmission time interval (sTTI), transmit uplink control information on a short physical uplink control channel (SPUCCH), receive downlink control information scheduling uplink data on a downlink sTTI, and transmit the uplink data on an uplink sTTI, wherein, in a case that the uplink sTTI includes 7 symbols and the downlink sTTI includes 2 or 3 symbols, the downlink sTTI in which the downlink control information is received is included in a set of predetermined downlink sTTIs, wherein the set of predetermined downlink sTTIs is determined based on whether the uplink data is transmitted in an uplink sTTI of index 0 or an uplink sTTI of index 1, and wherein, in a case that the uplink control information is transmitted on sTTIs of index n and n+1 and uplink sTTIs include 2 or 3 symbols, a frequency resource of a last symbol of the sTTI of index n and a frequency resource of a first symbol of the sTTI of index n+1 are the same.

6. The terminal of claim 5, wherein the set of predetermined downlink sTTIs includes a downlink sTTI of index 0 in a case that the uplink data is transmitted in the uplink sTTI of index 0.

7. A base station in a wireless communication system, the base station comprising:

a transceiver; and a processor coupled to the transceiver and configured to:

transmit configuration information on a shortened transmission time interval (sTTI), receive uplink control information on a short physical uplink control channel (SPUCCH), transmit downlink control information scheduling uplink data on a downlink sTTI, and receive the uplink data on an uplink sTTI, wherein, in a case that the uplink sTTI includes 7 symbols and the downlink sTTI includes 2 or 3 symbols, the downlink sTTI in which the downlink control information is transmitted is included in a set of predetermined downlink sTTIs, wherein the set of predetermined downlink sTTIs is determined based on whether the uplink data is transmitted in an uplink sTTI of index 0 or an uplink sTTI of index 1, and wherein, in a case that the uplink control information is received on sTTIs of index n and n+1 and uplink sTTIs include 2 or 3 symbols, a frequency resource of a last symbol of the sTTI of index n and a frequency resource of a first symbol of the sTTI of index n+1 are the same.

8. The base station of claim 7, wherein the set of predetermined downlink sTTIs includes a downlink sTTI of index 0 in a case that the uplink data is received in the uplink sTTI of index 0.

* * * * *